(12) United States Patent
Peleg et al.

(10) Patent No.: US 9,568,392 B2
(45) Date of Patent: Feb. 14, 2017

(54) SYSTEM AND METHOD FOR MONITORING RESOURCES IN A WATER UTILITY NETWORK

(75) Inventors: Amir Peleg, Kefar Ben-Nun (IL); Amitai Armon, Tel Aviv (IL); Uri Barkay, Ramat HaSharon (IL); Haggai Scolnicov, Tel Aviv (IL); Shai Gutner, Modi' in (IL)

(73) Assignee: TaKaDu Ltd., Yehud (IL)

( * ) Notice: Subject to any disclaimer, the term of this patent is extended or adjusted under 35 U.S.C. 154(b) by 619 days.

(21) Appl. No.: 13/040,435

(22) Filed: Mar. 4, 2011

(65) Prior Publication Data

US 2011/0215945 A1 Sep. 8, 2011

Related U.S. Application Data

(63) Continuation of application No. 12/717,944, filed on Mar. 4, 2010.

(51) Int. Cl.
G06Q 50/06 (2012.01)
G01M 3/28 (2006.01)
G06Q 10/06 (2012.01)

(52) U.S. Cl.
CPC ............ *G01M 3/2807* (2013.01); *G06Q 10/06* (2013.01); *G06Q 50/06* (2013.01); *Y04S 20/36* (2013.01); *Y10T 137/0318* (2015.04)

(58) Field of Classification Search
CPC .................................................... G06Q 50/06
USPC ........... 702/50, 100, 51; 340/870.02–870.03, 340/605; 73/40, 40.5; 137/1
See application file for complete search history.

(56) References Cited

U.S. PATENT DOCUMENTS

| | | | |
|---|---|---|---|
| 4,361,030 | A | 11/1982 | Heide |
| 4,712,182 | A | 12/1987 | Wakamori et al. |
| 4,796,466 | A | 1/1989 | Farmer |
| 4,797,621 | A | 1/1989 | Anderson et al. |
| 5,301,538 | A | 4/1994 | Recla |
| 5,315,529 | A | 5/1994 | Farmer |
| 5,546,789 | A | 8/1996 | Balke et al. |

(Continued)

FOREIGN PATENT DOCUMENTS

| | | |
|---|---|---|
| JP | 08-096039 | 4/1996 |
| JP | 2001140287 | 5/2001 |

(Continued)

*Primary Examiner* — Albert Wong
(74) *Attorney, Agent, or Firm* — Seth H. Ostrow, Esq.; Meister Seelig & Fein LLP

(57) ABSTRACT

A computerized method for monitoring a water utility network, the water utility network comprising a network of pipes for delivering water to consumers and a plurality of meters positioned within the pipes across the water distribution network. The method includes receiving meter data representing parameters measured by the meters, such as flow, pressure, chlorine level, pH and turbidity of the water being distributed through the pipes. The method also includes receiving secondary data from sources external to the meters and representing conditions affecting consumption of water in a region serviced by the water utility network such as weather and holidays. The meter and secondary data is analyzed using statistical techniques to identify water network events including leakage events and other events regarding quantity and quality of water flowing through the pipes and operation of the water network. The events are reported to users via a user interface.

34 Claims, 15 Drawing Sheets

(56) References Cited

U.S. PATENT DOCUMENTS

| | | | |
|---|---|---|---|
| 5,708,195 A | 1/1998 | Kurisu et al. | |
| 5,756,880 A | 5/1998 | Chen et al. | |
| 5,883,815 A | 3/1999 | Drakulich et al. | |
| 6,067,477 A | 5/2000 | Wewalaarachchi et al. | |
| 6,076,048 A | 6/2000 | Gunther et al. | |
| 6,088,417 A | 7/2000 | Jax et al. | |
| 6,109,096 A | 8/2000 | Chen et al. | |
| 6,147,613 A | 11/2000 | Doumit | |
| 6,290,908 B1 | 9/2001 | Fukunaga et al. | |
| 6,336,131 B1 | 1/2002 | Wolfe | |
| 6,398,930 B2 | 6/2002 | Fukunaga et al. | |
| 6,444,172 B2 | 9/2002 | Fukunaga et al. | |
| 6,477,434 B1 | 11/2002 | Wewalaarachchi et al. | |
| 6,526,358 B1 | 2/2003 | Mathews, Jr. et al. | |
| 6,687,637 B2 | 2/2004 | Garabedian | |
| 6,691,724 B2 | 2/2004 | Ford | |
| 6,845,336 B2 | 1/2005 | Kodukula et al. | |
| 6,862,540 B1 | 3/2005 | Welch et al. | |
| 6,963,808 B1 | 11/2005 | Addink et al. | |
| 6,970,808 B2 | 11/2005 | Abhulimen et al. | |
| 6,985,779 B2 | 1/2006 | Hsiung et al. | |
| 6,985,831 B2 | 1/2006 | Ito et al. | |
| 6,993,403 B1 | 1/2006 | Dadebo et al. | |
| 6,995,846 B2 | 2/2006 | Kalayeh et al. | |
| 7,119,698 B2 | 10/2006 | Schleich et al. | |
| 7,135,956 B2 | 11/2006 | Bartone et al. | |
| 7,228,726 B2 | 6/2007 | Kates | |
| 7,233,843 B2 | 6/2007 | Budhraja et al. | |
| 7,233,876 B2 | 6/2007 | Halstead et al. | |
| 7,263,459 B2 | 8/2007 | Ito et al. | |
| 7,283,913 B2 | 10/2007 | Garnaes et al. | |
| 7,310,590 B1 | 12/2007 | Bansal | |
| 7,330,796 B2 | 2/2008 | Addink et al. | |
| 7,412,876 B2 | 8/2008 | Kates | |
| 7,424,399 B2 | 9/2008 | Kahn et al. | |
| 7,437,267 B2 | 10/2008 | Oka et al. | |
| 7,504,964 B2 | 3/2009 | Bianchi et al. | |
| 7,523,016 B1 | 4/2009 | Surdulescu et al. | |
| 7,526,944 B2 | 5/2009 | Sabata et al. | |
| 7,529,644 B2 | 5/2009 | Lenz et al. | |
| 7,536,371 B2 | 5/2009 | Hartman et al. | |
| 7,558,703 B2 | 7/2009 | Stoupis et al. | |
| 7,558,771 B2 | 7/2009 | Barajas et al. | |
| 7,587,481 B1 | 9/2009 | Osburn, III | |
| 7,647,136 B2 | 1/2010 | McDowell | |
| 7,669,461 B2 | 3/2010 | Kates | |
| 7,670,494 B2 | 3/2010 | Frank | |
| 7,680,611 B2 | 3/2010 | Guidi et al. | |
| 7,698,073 B2 | 4/2010 | Wolfe | |
| 7,720,615 B2 | 5/2010 | Kim | |
| 7,739,004 B2 | 6/2010 | Johnson | |
| 7,793,188 B2 | 9/2010 | Mukhopadhyay et al. | |
| 7,880,641 B2 * | 2/2011 | Parris et al. | 340/870.02 |
| 7,920,983 B1 * | 4/2011 | Peleg et al. | 702/100 |
| 2002/0116282 A1 | 8/2002 | Martin et al. | |
| 2003/0101009 A1 | 5/2003 | Seem | |
| 2003/0192600 A1 | 10/2003 | Ford | |
| 2005/0190074 A1 | 9/2005 | Cumeralto et al. | |
| 2005/0246112 A1 | 11/2005 | Abhulimen et al. | |
| 2005/0279169 A1 | 12/2005 | Lander | |
| 2006/0179463 A1 | 8/2006 | Chisholm et al. | |
| 2007/0016399 A1 | 1/2007 | Gao et al. | |
| 2007/0203860 A1 | 8/2007 | Golden et al. | |
| 2007/0219728 A1 | 9/2007 | Papageorgiou et al. | |
| 2007/0233397 A1 | 10/2007 | Kim | |
| 2007/0247331 A1 * | 10/2007 | Angelis et al. | 340/870.02 |
| 2007/0288200 A1 | 12/2007 | Guidi et al. | |
| 2008/0109175 A1 | 5/2008 | Michalak | |
| 2008/0150750 A1 * | 6/2008 | Parris et al. | 340/870.02 |
| 2008/0168339 A1 | 7/2008 | Hudson et al. | |
| 2008/0250497 A1 | 10/2008 | Mullarkey et al. | |
| 2009/0299660 A1 | 12/2009 | Winter | |
| 2010/0156665 A1 * | 6/2010 | Krzyzanowski et al. | 340/870.02 |
| 2010/0169477 A1 | 7/2010 | Stienhans et al. | |
| 2011/0095903 A1 * | 4/2011 | Gudlavenkatasiva et al. | 340/870.02 |

FOREIGN PATENT DOCUMENTS

| | | |
|---|---|---|
| JP | 2005149280 | 6/2005 |
| JP | 2009192340 | 8/2009 |

* cited by examiner

SYSTEM AND METHOD FOR MONITORING RESOURCES IN A WATER UTILITY NETWORK

CLAIM OF PRIORITY

This application is a continuation of and claims priority to U.S. Ser. No. 12/717,944, filed on Mar. 4, 2010, which is incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The field of the invention relates generally to monitoring resource distribution systems, such as a water utility network, and detecting anomalies associated with the distributed network.

BACKGROUND OF THE INVENTION

The United Nations notes that water use has been growing at more than twice the rate of population increase in the last century, and an increasing number of regions are chronically short of water. By 2025 two-thirds of the world's population could be under water stress conditions as a result of increased populations. Water, especially potable water, is essential for all socio-economic developments and for maintaining a healthy population. As populations increase across the globe they call for an increased allocation of clean water for use, resulting in increased water scarcity.

One method to address water scarcity and conserve resources is the detection of leaks and other events occurring in water utility networks. Some experts estimate that losses due to leaks and theft amount to 25-30% of the water flowing through water utility networks. Therefore, a significant amount of water may be conserved merely by addressing the water loss in systems already controlled by humans.

Old and poorly constructed pipelines, inadequate corrosion protection, poorly maintained valves, and mechanical damage are some of the factors that contribute to water loss. Additionally, water leaks reduce the supply pressure in the system, and as a result the utility must raise pressure in the system to make up for the losses. Raising the system pressure results in more water being pumped and raises the energy consumption of the water utility. Indeed, water distribution networks are the single biggest consumers of energy in many countries. By identifying and correcting water leaks and other network issues, utilities can conserve water for future use and dramatically reduce energy consumption.

Adding to the difficulty is that most water utility networks are large and complex, and have been built through piecemeal growth, with many pipes in arbitrary configurations to serve specific geographical needs that develop over time. Further, most water utility networks lack accurate, frequent, real-time customer consumption metering, which might allow for a simple conservation of mass input and output accounting. Additionally, water utility networks are designed to deliver water to a large number of consumers, whose individual behavior is unpredictable and subject to change due to many factors. Such factors include, for example, weather changes and natural events (e.g., hot weather increases consumption, as do droughts), holidays and atypical social events (e.g., causing consumers to remain home and water use to increase in residential networks and decrease in business neighborhoods), and demographic changes in neighborhoods over time.

Existing methods for leak detection in water utility networks do not adequately address these problems. For example, commercially available hardware leak detection devices used for field surveys, such as acoustic sensors, can be effective at pinpointing a leak within a given area, but are expensive to install and operate and do not provide rapid discovery and blanket coverage of a whole network. Existing water IT systems, such as the Advise™ Water Leakage Management available from ABB, attempt to make some use of meter data but that use is simplistic and thus the results are of limited usefulness. For example, the systems do not accurately identify or report in real time on specific individual events such as leaks or other network events, do not identify meter faults or adverse water quality conditions, lack statistical analysis needed to accurately understand routine network operation, and suffer other deficiencies. Furthermore, the systems currently in use lack the ability to detect energy loss or water thefts. A key failing of most current approaches is a lack of deep statistical modeling of the many unmetered components of water networks, most notably the water consumption by service customers, which is frequently modeled by very rudimentary techniques, yet has a profound impact on any analysis of the network.

Supervisory Control and Data Acquisition ("SCADA") systems have become increasingly available in water utilities throughout the world, collecting data from a variety of meters within the network, measuring quantities such as flow and pressure. However, at most utilities these systems are used by a few skilled operators mainly for ongoing operational needs; utilities make little use of the historical data accumulated in their systems to automatically (or otherwise) detect leaks and other anomalous network events. Furthermore, any anomaly detection is usually limited to single-sensor fixed-bound alerts, leading either to low sensitivity or to a high proportion of false alerts.

Water utility network operators continue to add even more meters to monitor the activity of distribution systems. While this does provide greater amounts of data regarding the network, and hence greater potential for understanding events within the network, the increased volume of data often serves merely to confuse network operators further, and exacerbate the already difficult "needle in a haystack" aspect of water network monitoring. Moreover, the placement of more meters is not usually optimized to improve the usefulness of data being received from the overall system for advanced monitoring purposes. As a result, the increased volumes of data describing network activity are unorganized and often confusing and do not allow network operators to make any better decisions about the status of the water utility network.

As such, there exists a need for improved systems and methods to better analyze data retrieved from a water utility network and data about the utility network and the consumption of its resources to facilitate improved management of these resources.

SUMMARY OF THE INVENTION

Some or all of the above and other deficiencies in the prior art are resolved by a computerized method for conserving water by monitoring a water distribution network, the water distribution network comprising a plurality of pipes and network devices such as pressure reducing valves, reservoirs, or pumps, for delivering water to consumers and a plurality of meters positioned at locations within the water distribution network. The meters may be positioned on the interior or exterior of the pipes, near the network devices, or in other arbitrary locations. In some embodiments the method includes receiving meter data from the meters, the data representing a plurality of parameters measured by the meters, the parameters including at least flow of the water through the pipes. In some embodiments, the meter data is Supervisory Control and Data Acquisition (SCADA) data. In some embodiments, the meter data is processed before being analyzed such as by filtering out noise from the meter data and by formatting it for storage in a network information database.

According to some embodiments, the meter data is analyzed to identify water network events, the water network events comprising leakage events and informational events regarding consumption of water delivered over the water network and operation of the network and the meters. The informational events that may be reported include an unexpected increase in consumption pattern, a change in consumption pattern, a theft of water, a zonal boundary breach, a utility meter fault, and a network device malfunction. The method according to some embodiments may further include receiving over time water quality data representing turbidity, chlorine and pH of the water delivered over the network and identifying network events by detecting changes in the water quality data over time in excess of a statistical, proportionate, or constant value threshold.

The one or more network events are reported to a user via a user interface. In some embodiments the water network events are stored in a database so they may be accessible to a variety of interface modules that report the events in different ways, including through event lists, graphs or trend data, and trouble tickets or other alerts.

In some embodiments, the method includes receiving secondary data from one or more sources external to the meters, the secondary data representing one or more conditions affecting consumption of water in a region serviced by the water utility network. The secondary data could include, for example, weather data representing weather conditions in the region of the water utility network, calendar data representing one or more factors affecting water consumption on a given date, repair data representing one or more repairs performed on the water utility network, and structural data representing a structure of the water utility network. As explained further herein, this secondary data can be analyzed along with the meter data to provide better, more accurate results and to reduce or eliminate false alarms. For example, an anomalous increase in water flow or consumption in a given region of a water utility network may be explained by above average heat or dryness or by a holiday or other natural or human event which causes people to stay home and not go to work or otherwise change the typical consumption pattern at a particular location or locations.

In some embodiments, meter data is analyzed by statistically predicting meter data for a first meter based on other meter data from the water utility network, such as by calculating a statistical distribution of likely values for the first meter, and comparing the received meter data for the first meter with the predicted meter data for the first meter. By way of illustration, historical data may indicate that the first meter's values are typically approximately double the values measured concurrently by a second meter; then the first meter is predicted to have a current reading approximately double the reading recently obtained from the second meter. The network events may be identified by detecting an anomaly if the actual received meter value from the first meter deviates from the predicted meter value for the first meter by a predefined statistical deviation, for a duration exceeding a predefined threshold, if their frequency occurrence within a predefined window of time exceeds a predefined threshold, or by other means. Statistical anomaly detection in meter values is a robust way to overcome the difficulties inherent in the many unmetered components of water networks, most notably the water consumption by service customers, which has a profound impact on any analysis of the network. Statistical structure in this consumption, such as a tendency to periodicity, propagates throughout the network, leading to similar or derived statistical structure in meter values, allowing an analysis of the likelihood that particular meter values were generated during routine operation of the network (no anomaly). In addition, the use of statistical anomaly detection as described herein allows for use of the methods and systems of the present invention with networks that supply meter data that does not cover every portion of the network, is not provided on a real-time basis, or is otherwise incomplete and deficient. Thus, for example, the anomaly detection described herein is designed to be most useful in water utility networks in which meters are only present at certain network junctions or locations, or in which meter readings are taken at consumer residences on a monthly basis or otherwise fail to provide up to date information. Indeed, as explained above, typical water utility networks suffer from one or more of these types of deficiencies in the meter data collected from the network, and lack accurate, frequent, real-time customer consumption metering, which might allow for a simple conservation of mass input and output accounting, and are designed to deliver water to a large number of consumers, whose individual behavior is unpredictable and subject to change due to many factors.

In some embodiments, statistically predicting meter data for the first meter based on other meter data from the water utility network includes selecting one or more second meters as one or more corresponding meters and correlating meter data received from the first meter with meter data received from the one or more corresponding meters. The one or more second meters may be selected by correlating historical meter data for the one or more second meters with historical meter data for the first meter. In some embodiments, the one or more second meters may be meters which each historically had close correlation with the values of the first meter. Loosely speaking, in routine network operation, the first meter's values are expected to continue this correlation. By way of illustration, such a situation may arise when several meters measure the flow of water consumed by several distinct neighborhoods with similar demographics, and hence similar (or proportional) consumption patterns. The one or more second meters may further be selected as ones which are positioned within the water utility network so as to be unaffected by local anomalies affecting the first meter, of the sort which is of interest to the network operator, such as a leak; yet, being part of the same network and general area, the second meters are affected by the same global anomalies, such as increased consumption on a hot day. In this way, a local anomaly affecting the data from the first meter will not affect the data from the second meters and so will be easier to detect by a statistical comparison to the data from the second meter(s), yet a global anomaly will not generate a false alert, even if its cause is unknown.

Some or all of the above and other deficiencies in the prior art are resolved by a computerized system for monitoring a water utility network, the system having a network information database for storing meter data representing a plurality of parameters measured by the meters, the parameters including at least flow of the water through the pipes, and secondary data from one or more sources external to the meters, the secondary data representing one or more conditions affecting consumption of water in a region serviced by the water utility network. The system further contains an analysis engine configured to analyze the meter data and secondary data to identify anomalies, an event classification engine configured to identify water utility network events based on the anomalies, the water network events comprising leakage events and other events regarding quantity or quality of water flowing through the pipes and network devices and operation of the water utility network, and an event database for storing water utility network event data representing the one or more water network events identified by the event classification engine. The system may further include a set of interface modules for retrieving water utility network event data from the event database and reporting it to users.

In some embodiments the analysis engine comprises a plurality of predictor modules for generating a statistical distribution of likely values of the meter data for a given meter, assuming routine operation and no anomalous events, and a plurality of anomaly detector modules for comparing the actual meter data for the given meter to the distribution of likely values to detect anomalies in the meter data.

Some or all of the above and other deficiencies in the prior art are resolved by a computerized method for managing a water utility network, the method comprising sending meter data to an analysis engine, receiving from the analysis engine data representing water utility network events, and displaying the received water utility network events to a user on a computerized display device. According to some embodiments the water network events include leakage events and other events regarding quantity or quality of water flowing through the pipes and network devices and operation of the water utility network. The water utility network event data may have been identified as a result of analysis of the meter data and secondary data, the secondary data representing one or more conditions affecting consumption of water in a region serviced by the water utility network.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE EMBODIMENTS

In the following description, reference is made to the accompanying drawings that form a part hereof, and in which is shown by way of illustration of specific embodiments in which the invention may be practiced. It is to be understood that other embodiments may be utilized and structural changes may be made without departing from the scope of the present invention.

Figure 1:
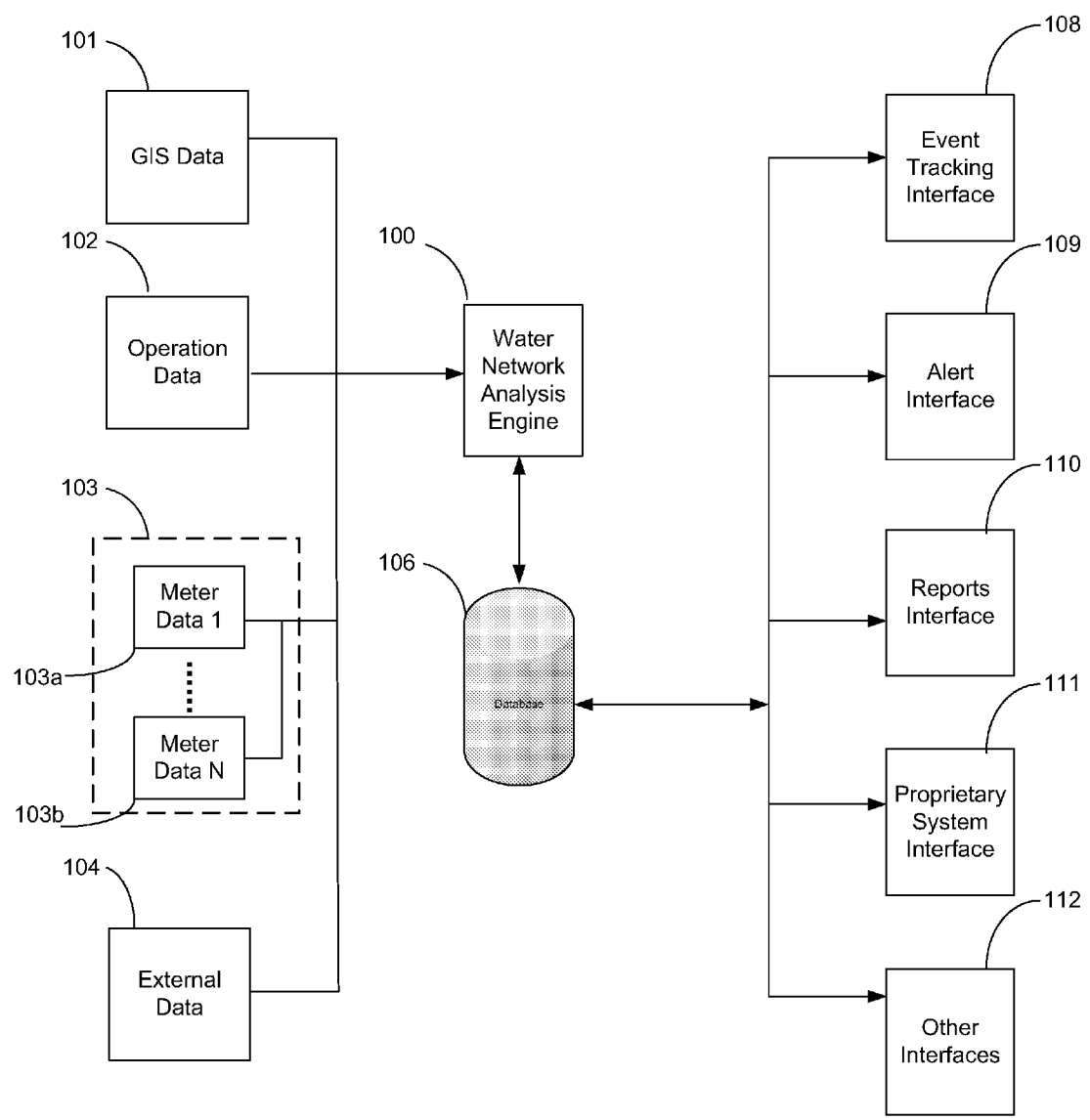
FIGS. 1 and 2 present block diagrams depicting systems for monitoring a water network according to embodiments of the present invention.

FIG. 1 presents a block diagram illustrating one embodiment of a system for monitoring resources in a water distribution system. As shown in FIG. 1, the system includes a Water Network Analysis Engine 100 composed of various software modules and databases residing on computer hardware and performing the functions described further below. The engine 100 may include one or more processing devices performing the below-described operations in response to executable instructions. The Water Network Analysis Engine 100 analyzes data received from different meters, sensors, reading devices, or other data pertaining to a distribution network. One of skill in the art will appreciate that unless the specific context explicitly indicates otherwise, as used herein the terms "meter" and "sensor" generally refer to the same class of network devices and encompass any meter, sensor, gauge, or other device capable of measuring parameters or values or a stimulus, especially stimuli relating to a water distribution network. The system identifies anomalies and events based on that data and provides real-time alerts or off-line data reports to users who can then take action, as appropriate, to address any phenomena or events identified by the Analysis Engine 100. As described further below, the anomalies and events identified by the Analysis Engine 100 include leaks, bursts, unexpected consumption of water, faulty meters, meter calibration problems, water quality changes, other issues important to the quantity of water being delivered over the network, malfunctions in network devices, and other issues known to those skilled in the art.

As shown in FIG. 1, the data received as inputs to the Water Network Analysis Engine 100 include, in some embodiments, GIS data 101, Operation Data 102, Water Distribution System 103, Meter Data 1 103a, Meter Data N 103b, and External Data 104.

GIS Data 101 is data from a geographical information system ("GIS") which describes the structure and layout of the water network and positioning of the meters across it, and includes meter types, meter locations, meter ages, descriptions of the water pipes such as diameters and manufacturing materials, partitions of the network into pressure zones and/or supply zones, a city or area map, and additional evolving data recognized to one of skill in the art. Any other characteristics of the geography and engineering of the water distribution system may also be utilized, as well as any other data relied on by one skilled in the art. It is also noted that this data may be evolutionary data including updates consistent with the evolution of the underlying resource system itself, for example when new water pipes, connections, meters, etc., are installed or otherwise modified in the system. Furthermore, this data may include updates when the underlying resource system is sampled or measured, for example when existing pipes are inspected for material fatigue or internal constriction by accumulated solid deposits.

Operation Data 102 includes asset management information, and may be any information in a digital format on operations performed by the network operator that can be correlated with meter readings to determine or refute an anomaly. For example, Operation Data 102 may include information concerning water network operations, such as routine or planned water network operations, opening and closing of valves that affect water flow, pump operations, acoustic surveys, repairs or improvements made to any part of the water network, dates and times of the repairs/improvements, locations of the repairs/improvements, routine maintenance made to the network, and access control information indicating when and where on the network technical personnel may be active. In one embodiment, Operation Data 102 is provided by the system used to manage the water network.

Monitored water distribution systems produce vast amounts of time dependent data such as, but not limited to, hydraulic indicators such as flow, pressure, and reservoir level, and quality indicators such as chlorine, turbidity, pH, and others. This data may be produced by meters distributed throughout the network, and may be represented by the Water Distribution System 103. Furthermore, the meters distributed throughout the network may be in arbitrary locations, or locations that only provide a partial representation of the entire network. Meter Data 1 103a and Meter Data N 103b represent data produced by the various sensors and meters in Water Distribution System 103. One example of a system used to collect network data such as that represented by Network Data 103a and Meter Data 103b is a SCADA system. SCADA data may include continuous time-dependent meter data, such as pressure of the water, flow rate of the water, turbidity of the water, chlorine levels in the water, pH of the water, and reservoir water levels. Those of skill in the art are familiar with SCADA data systems and can appreciate that the term represents an abstraction of data collection from an industrial process, in this case a distribution network.

External Data 104 includes additional information relevant to water consumption and network conditions, but not strictly within the above categories, such as weather reports, holidays or other calendar events that affect water consumption and network behavior within given portions of the network, or any other event by the utility itself or its customers that may impact the function of the water network.

The Water Network Analysis Engine 100 analyzes the various input data streams and returns output categorized and formulated as event data in accordance with processing operations described in further detail below. Water Network Analysis Engine 100 stores data in Database 106, and data from Database 106 is retrieved by one or more interface systems, such as Event Tracking Interface 108, Alert Interface 109, Reports Interface 110, Proprietary System Interface 111, and Other Interfaces 112. Water Analysis Engine 100 may also access previously stored data from Database 106, to provide continuity in the reporting of events, for example to update that a previously detected event is still ongoing, rather than detecting it as an additional, separate event. Different types of interface systems are used to provide information on events to users or external systems in different ways. For example, the Event Tracking Interface 108 enables users to browse through all events detected on the network, whereas the Alert Interface 109 sends out alerts to users (e.g. via an email, SMS or voice message) or external systems that have been determined by rule or policy to require more immediate attention. The interfaces 108-112 may be accessed by various computerized devices, such as desktop computers and laptops, cell phones, blackberry devices, smart phones, pagers and other mobile devices programmed to receive pages, trouble tickets and other types of alerts. The interfaces 108-112 may be accessed by the computerized devices requesting them from servers connected over any suitable network, such as but not limited to the internet, or may be pushed out to such devices for viewing by users or input into other systems such as trouble tickets systems. Outputs from Water Network Analysis Engine 100 may be stored in Database 106, in an electronic log file, or printed to paper.

Figure 2:
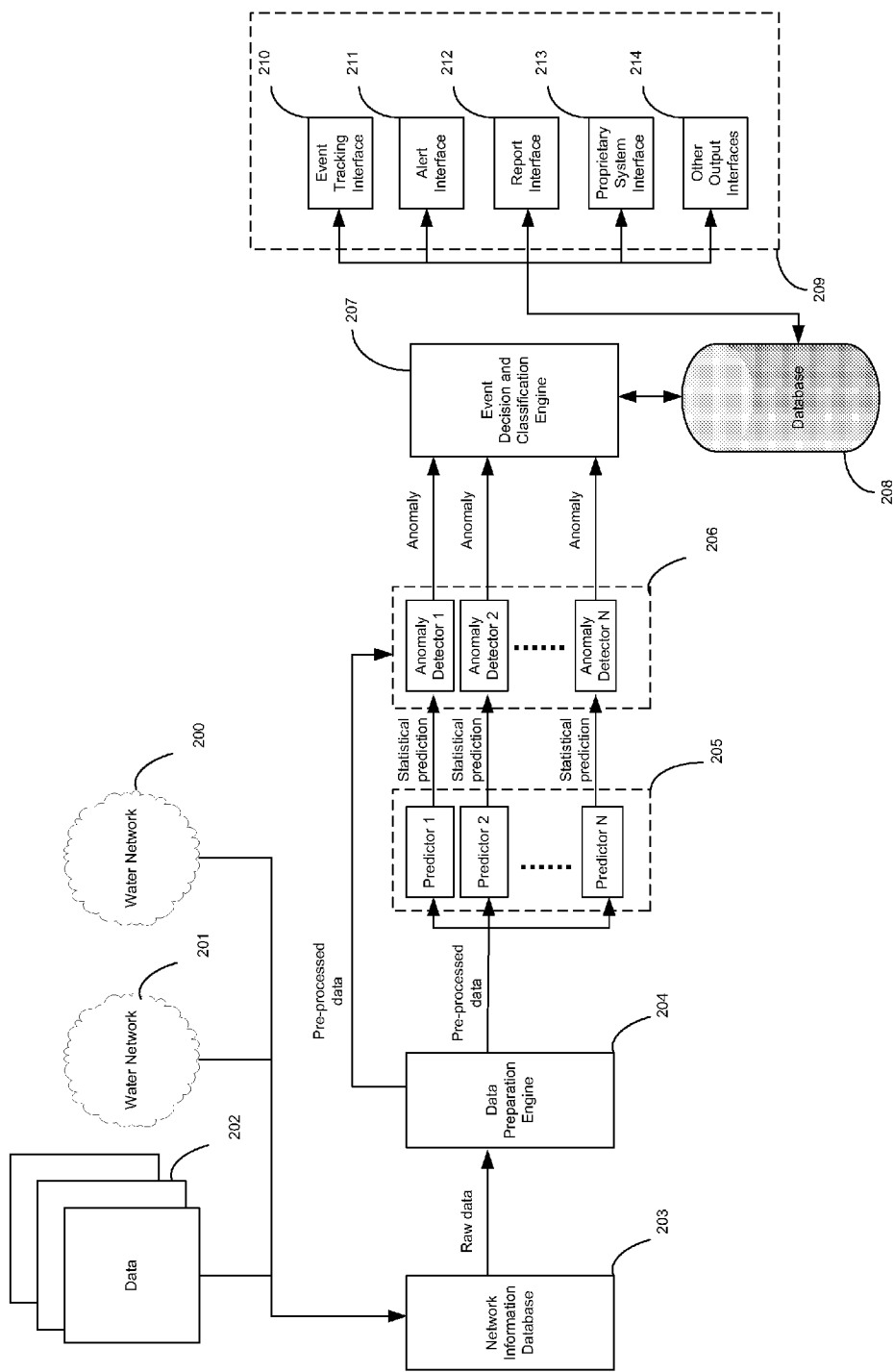

Although illustrated as a single system, in various embodiments the illustrated system may be integrated and/or distributed across multiple hardware devices and may be distributed logically, physically or geographically. Water Network Analysis Engine 106 may be any suitable physical processing device performing processing operations as described herein, in response to executable instructions. Water Network Analysis Engine 100 may also include any suitable type of storage device operative to electronically store data. FIG. 2 presents a block diagram depicting further details of a water network monitoring system according to certain embodiments. In one embodiment, elements 203-207 form the Water Network Analysis Engine 100 of FIG. 1. FIG. 2 includes Water Network 200, Water Network 201, Data 202, Network Information Database 203, Data Preparation Engine 204, Predictors 205, Anomaly Detectors 206, Event Decision and Classification Engine 207, Database 208, and Output Interfaces 209, including Event Tracking Interface 210, Alert Interface 211, Report Interface 212, Proprietary System Interface 213, and Other Interfaces 214.

Water distribution systems, represented by elements 200 and 201, are one or more connected water distribution systems, or water distribution systems located in different areas with few or no connections between them. In one embodiment, elements 200 and 201 may be any suitable resource distribution network, such as a municipal, rural, or wholesaler water utility network, liquid distribution network in a factory or other large building, or naval vessel, or any suitable resource collection network such as a sewer system. One of skill in the art will appreciate that elements 200 and 201 may be any water distribution or collection system. Water Network 200 and Water Network 201 send time-dependent data representative of the network, such as water flow, pressure, turbidity, reservoir level, chlorine level, and pH level. For example, the network may obtain this information by using a SCADA system. Data from Water Network 200 or Water Network 201 may report data from specific meters, or collections of meters, some of which may be related. For example, meters may be grouped geographically by zone or by District Metered Area (DMA), as one skilled in the art will appreciate. The data may be sent directly from the meters or collections of meters in the network, or the data may come from a Network Interface Database 203; additionally the data could be enriched by Data Preparation Engine 204 to, for example, add or calculate new types of data such as morning and evening consumption data. For convenience, the term "meter data" will be used in this specification to refer to the actual data from a single meter, or a predefined meaningful combination of readings from multiple meters or of multiple readings from one or more meters received over time, such as the total sum ingoing flow to a DMA, or any similar predefined calculation generating a meaningful set of time-dependent data describing some aspect of the network. One skilled in the art will readily identify such meaningful combinations, based on the network layout and the locations of individual meters. Data 202 represents other data including asset management information, which may be any information in a digital format that can be correlated with meter readings to determine or refute an anomaly. For example, this may include information concerning water network operations, such as routine or planned water network operations, opening and closing of valves that affect water flow, acoustic surveys, repairs or improvements made to any part of the water network, dates and times of the repairs/improvements, locations of the repairs/improvements, routine maintenance made to the network, and access control information indicating when and where on the network technical personnel may be active. Additionally, Data 202 includes additional information relevant to water consumption and network conditions, such as weather reports, holidays or other calendar events that affect water consumption and network behavior within given portions of the network, or any other event by the utility itself or its customers that may impact the function of the water network.

Network Information Database 203 aggregates the raw data collected from the meters in Water Networks 200 and 201, and Data 202. Data from Network Information Database 203 is sent to Data Preparation Engine 204. Data Preparation Engine 204 organizes and formats received data to be further processed. As known to those of skill in the art, data formats used by different water distribution systems may differ from one another. For example, the city of London may collect and store network data in a format completely different than New York City. Additionally, Data Preparation Engine 204 prepares data for analysis by removing data not reflecting the actual performance of the network or reflecting a transient phenomenon that system designers or network managers have decided not to address; methods commonly known in the art may be applied to "smooth" the data collected from the network. Some of these methods are LOWESS and heuristic cleaning as applied to the specific data being received from a given water network. Data Preparation Engine 204 extracts the data elements from the network data and formats them into a consistent format. Among filtered information may be noise associated with the data transmissions from aspects of the resource, such as for example noisy data transmission from a meter, or errors associated with the data measurements, transmissions or collection. Data Preparation Engine 204 may also output all data received from Water Networks 200 and 201, after it has been formatted but with less or no filtering or smoothing, to allow the system to analyze data that could otherwise be discarded if one of the smoothing techniques is first applied. Data Preparation Engine 204 sends pre-processed data to Predictors 205 and Anomaly Detectors 206. One of skill in the art will appreciate that elements 203-214 may be contained in or reside on the same device, or distributed among multiple devices.

In one embodiment, Predictors 205 contain N number of individual predictors using various techniques. As described further below, the Predictors 205 analyze sets of data and provide predictions of statistical distributions of the expected actual meter values assuming no anomalous events are occurring. As commonly known in the art, predictors may be designed using a machine learning framework to statistically analyze the data. Examples of the machine learning framework are discussed in Ethem Alpaydin, *Introduction to Machine Learning (Adaptive Computation and Machine Learning)*, MIT Press (2004), ISBN 0262012111; Ryszard S. Michalski, Jaime G. Carbonell, Tom M. Mitchell, *Machine Learning: An Artificial Intelligence Approach*, Tioga Publishing Company (1983), ISBN 0-935382-05-4 hereby incorporated by reference in their entirety. More detailed descriptions of the operation of some specific predictors are found in FIGS. 5-6 and the accompanying descriptions.

Anomaly Detectors 206, which may include M number of individual detectors, receive statistical prediction data from Predictors 205 and pre-processed data from Data Preparation Engine 204. As discussed in FIG. 5, the data set received from the Predictors 205 includes a distribution with the likely value, variance, and any other statistical descriptor of the values. One of skill in the art will recognize that the data set may contain multiple likely and actual values for the meter being analyzed. Anomaly Detectors 206 includes anomaly detectors for testing the likelihood of no anomaly for the meter and for testing the likelihood of alternative hypotheses such as specific event types. Anomaly Detectors 206 sends anomalies to Event Decision and Classification Engine 207. Some of those anomalies represent events in and of themselves, and some represent parts of events such as the start of an event, the end of an event, substantial change in an event, peak of an event, and the like.

Anomaly Detectors 206 are operative to analyze the significance of any deviations of the expected value sent from the Predictors and the actual value retrieved from the network. For each data set, each anomaly detector determines, by analyzing the significance of deviations, the statistical likelihood that no relevant anomaly occurred given the meter readings during a given time period. The Anomaly Detectors 206 analyze the significance of deviations over time, e.g., over minutes, hours, days or longer, since, for example, the continued or frequent occurrence of the deviations raise the significance of such deviations. As one of ordinary skill in the art will recognize, a system designer would design or adjust the Anomaly Detectors 206 to analyze deviations over a time period based on, among other things, the sensitivity desired for small time scale events, recently started events, which are usually detectable when they have large magnitudes, as opposed to small magnitude events which require sustained deviations over a longer time period for detection. Thus, for example, a small deviation that only occurs once or for a short period of time such as a minute would not be detected as an anomaly, while the same small deviation occurring over an extended time period or frequently within that period would be identified as statistically significant by the Anomaly Detectors 206 and detected as an anomaly.

Regarding analyzing the significance of deviations, for example, a meter reading, when compared to the historical statistical data, may be significant in light of the historical statistical data. For example, a difference of three standard deviations or a value in the top percentile may be a significant deviation. In other embodiments, the statistical deviation is measured by the distribution of deviations as a function of parameters. One such parameter may be the time of day, meaning that the significance of the deviation may depend on the distribution of deviations which may vary according to time of day. Other such parameters may include weather measurements such as temperature or humidity, weather warnings, holidays, or sporting events that may change network characteristics on that day or time of day. Additionally, the significant threshold of deviation of values may be changed by the level of statistical confidence desired by a system designer, user or water utility manager. In various embodiments the threshold is: (1) a statistical confidence level, computed based on the distribution of deviations from the correlation in the historical data, such as a specified multiple of the standard deviation; or (2) a constant, above which the system detects an anomaly. In some embodiments, the ratio of the actual value to the predicted value is analyzed, rather than the difference between the two; it is to be understood that the term "difference" is used to refer equally, in the case of such embodiments, to this ratio.

In one embodiment, an anomaly detector finds an anomaly when there exists a consistent statistically large deviation from expected values over a given period. Statistically large means a statistically significant relative bound (such as N standard deviations or K times the inter-quartile range, or other standardizations which take into account the actual distribution of the data, depending on particular implementations). Furthermore, when comparing "momentary" readings to the expected values, using the overall standard deviation (or other statistical descriptor) of differences from expected values can produce a high number of false positives, because the comparison may, for example, mix together high-variance times of day with low-variance times of day. Therefore, to reduce this error, the system compares a reading $X(t)$ to the predicted value $P(t)$ by dividing $X(t)-P(t)$ into, for example, the standard deviation of such differences at that approximate time of day, on that day of the week. The magnitude of the relative bound and the length of the period are parameters of the method, which enable particular instantiations to focus alternatively on shorter or on smaller events.

In another embodiment, an anomaly detector computes the area under the curve (AUC) of the difference between actual and predicted values over particular fixed periods (or, alternatively, of the absolute value of that difference–this affects whether or not low values may cancel out with subsequent high values). This computation may be performed in this way, for example, every quarter of a day. The AUC is not in itself a statistical quantity, but since these are fixed periods, the distribution may be empirically measured: if only 5% of meter X's AUC values between midnight and 6 am on a weekday were greater than X0, then finding such an AUC value is roughly "5% probable". The length of the fixed periods (and which periods they are compared to) are parameters of the method, which enable particular instantiations to focus alternatively on shorter or on smaller events.

Event Decision and Classification Engine 207 is operative to compare a statistical analysis from the M Anomaly Detectors 206 to determine the overall statistical likelihood of the no-anomaly hypothesis given recent meter readings. The Engine 207 would increase the statistical likelihood of an event based on the detection of multiple anomalies, from the same or different meters and at the same time or over a given time period, that all consistently indicate the occurrence of the event. For example, one anomaly may represent the start of an event and another anomaly may represent a change in the event or the end of the event, and the Classification Engine 207 recognizes those anomalies as being related to a single event. As another example, two anomalies from different meters related to increased flow, in a similar time and from related locations, would both indicate the same event. In one embodiment, heuristics are used to determine the overall statistical likelihood of a meter reading, based on a combination of the statistical likelihood of a reading from the temporal statistical data, and the statistical likelihood of a reading from the spatial statistical data. For example, if the historical statistical data comparison indicates that the meter's current reading is only 15% likely to be so high, but the Spatial statistical data comparison indicates that the meter's current reading is 95% likely to be so high, then the overall reading likelihood may be 75% likely to be so high. See, for example, Koziol, James and Tuckwell, Henry, "A Bayesian Method for Combining Statistical Tests." Journal of Statistical Planning and Inference 1999: 78(1-2), 317-323, herein incorporated by reference Examples of events detected by the analysis engine are a water leak, a burst, a faulty meter, a water theft, a communication fault, a water quality issue, an unexpected increase in consumption, a change in consumption pattern, network malfunctions such as abnormal reservoir levels or pressures, and others. Further detail regarding events may be included such as the start time of the event, the end time of the event, a magnitude of the event, a total water loss associated with the event, by way of example.

Event Decision and Classification Engine 207 also generates additional data regarding each event, such as start time, end time, magnitude of the event, an accumulated magnitude of the event such as the total water lost since the leak began, type, status, and physical units of the event, such as pressure units, pH, or chlorine concentration. Magnitude of the event is, in some embodiments, a value representing the size or proportion of the event, such as a calculation of extra flow over normal conditions, meter miscalculation, or chlorine change. This information is stored in Database 208 to be further sent to Interfaces 209. Certain outputs of anomalies are mapped to certain fields of events stored in Database 208. Examples of fields associated with events are: type of event (as determined by the Event Decision and Classification Engine 207), start time, end time, magnitude, and physical units of the event type.

One skilled in the art will appreciate that by using multiple predictors and anomaly detectors, comparing statistical likelihoods from the M Anomaly Detectors 206 may result in either an increased confidence that a detected event is an anomaly, or may result in a decreased confidence that a detected event is an anomaly. In one embodiment, the Event Decision and Classification Engine 207 may weigh the events or event parts sent from each M Anomaly Detector equally. In another embodiment the Event Decision and Classification Engine 207 may assign weights to the events or event parts sent from each M Anomaly Detector based on a predefined configuration.

Database 208 receives information from Event Decision and Classification Engine 207 for storage in Database 208 and for retrieval from Database 208 by Output Interfaces 209.

Event Tracking Interface 210 provides a list of events to users of the system. Users may view individual events and their associated data by selecting a listed event. Events sent to Event Tracking Interface 210 may be filtered by the user of the system. For example, a user tasked with only repairing leaks may only see leak events, while an administrator of the system may see every type of event and the event data or an aggregate view of events. Different users view different types of events, and the needs or responsibilities of a user may dictate which events that user sees. For example, a leakage manager may elect to view only high-confidence leak events, or only leaks with magnitude above some fixed threshold. In another example, users tasked with monitoring one neighborhood see events associated with meter data located in that neighborhood. In another example, managers of the Water Network 201 see all events associated with Water Network 201, while administrators of both Water Network 200 and 201 see all events related to both networks. One of skill in the art will recognize that standard role-based user interface, access control, and user management methods, which may be managed by system administrators, may be used to provide this granularity of access to event data and reports.

Event data represented in the Event Tracking Interface 210 may include the event start time, type, location, magnitude and status. Additionally, a user selecting the event may be further presented with more detailed information such as maps, graphs, comments posted by users related to the selected event, and annotations to selected events, maps, graphs and the like made by the engine or users, as explained below. As a more detailed example, users of Event Tracking Interface may annotate events, or include hyperlinks to other events or user interface objects. The annotations are communicated from the Event Tracking Interface as, for example, HTML form fields communicated over the web and stored in Database 208 in the associated event record to be viewed by other users of the system. Users may also assign ownership or responsibility of an event or of tasks related to the event to other users of the system. For example, a leakage analyst may assign a particular suspected leak to an adjacent zone's water engineer, to query whether recent maintenance could explain a flow anomaly, or to a control room manager to recommend or request a survey and repair. The detailed event information presented to a user includes data that will further help the user make an informed decision about the event and act on it accordingly. For example, if the system detects a leak and sends a leak event to 210, the system provides the event data from the event record and the visualization of the data through maps, graphs and the like to show, for example, a comparison of the present, actual values against predicted or past values. For example, one visualization of the event data may be in the form of a graph showing flow rate over time and a highlighted portion of the increase in flow rate indicative of a leak, to help the user focus on important aspects of the event. Sample screenshots for the Event Tracking Interface 210 are shown in FIGS. 11-15.

Alert Interface 211 operates, according to predefined rules or policies, to identify certain events that need to be pushed out to specific users through the computerized devices designated by the users. For example, a user may specify, through rules or policies, that certain events of a specified magnitude get sent in email messages directed to the user while other events of more urgent or time-sensitive types or of larger specified magnitudes get pushed out to his or her mobile phone through text, paging, or the like. The alerts generated by the Alert Interface 211 contain certain specified data about the alert to assist the user to make an informed decision about the event. The user can configure the Alert Interface 211 as to how much detail to include in the messages themselves and how much additional data to make available for the user to retrieve for example through a link to an item in the Event Tracking Interface 210.

The Report Interface 212 is a reporting system that retrieves event data from the Database 208 and generates various reports, tables, charts, graphs and the like to illustrate events or aggregations of events. As will be understood by one of ordinary skill in the art, the Report Interface 212 allows users to aggregate events and event data by any desired field(s) or parameter(s), such as geographic, time, type of event, and the like. Reports generated through the Report Interface 212 allow users such as water network managers to better plan future repairs or improvements to their network, the placement of meters, or other decisions related to operational, design, inventory and other considerations.

Proprietary System Interface 213 is a system which interfaces with another software program used by the operators of the water distribution system. For example Proprietary System Interface 213 retrieves event data from the Database 208 and inputs all or a specified part of it into a trouble ticket system to inform maintenance personnel of leaks or other events. An example of trouble ticketing software is Numara®'s Track-It!®. As another example, the event data may be sent to a workflow system or asset management system (such as the Maximo™ system available from IBM Corp.) so that the event may be more readily acted upon. Event data, for event reporting to users, is well categorized and can be adapted for use by any industry standard interface. One example of a workflow system interface is Handysoft's Bizflow®.

Further to any of the previously described embodiments, elements 203-209 may reside on a server or set of servers such as a web server and may utilize an application service provider ("ASP") model to provide users of Interfaces 209 with access to alerts and reports via a web interface.

Figure 3:
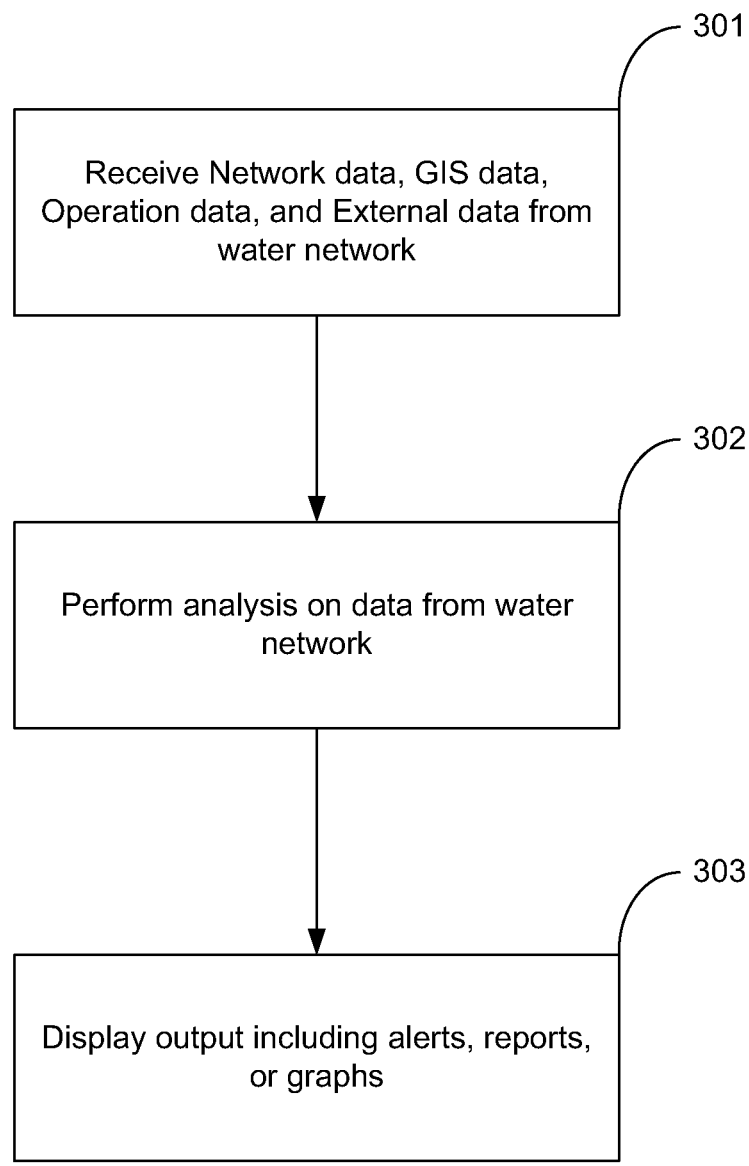
FIG. 3 presents a flow diagram illustrating a method for monitoring a water network according to an embodiment of the present invention.

FIG. 3 presents a flow diagram illustrating a method for monitoring a water network according to embodiments of the present invention. In step 301, the system receives data from or about the water network, including Network data (e.g., SCADA data), GIS data, operation data, and external event data from the water distribution system and other sources. The system is operative to receive other types of data from the same or other sources, and can be modified to process such data with the same, analytical approach. Step 301 may be performed, in one embodiment, by element 100 in FIG. 1, or more specifically by element 203 in FIG. 2. Next in step 302 the system analyzes the received data using statistical models and other algorithms described herein. Step 302 may be performed, in one embodiment, by element 100 in FIG. 1, or more specifically any combination of elements 204-208 in FIG. 2. Lastly, in step 303, the system generates and displays output including events, alerts, reports, and graphs. Step 303 may be performed, in one embodiment, by elements 106-112 in FIG. 1, or more specifically by elements 210-214 in FIG. 2.

Figure 4:
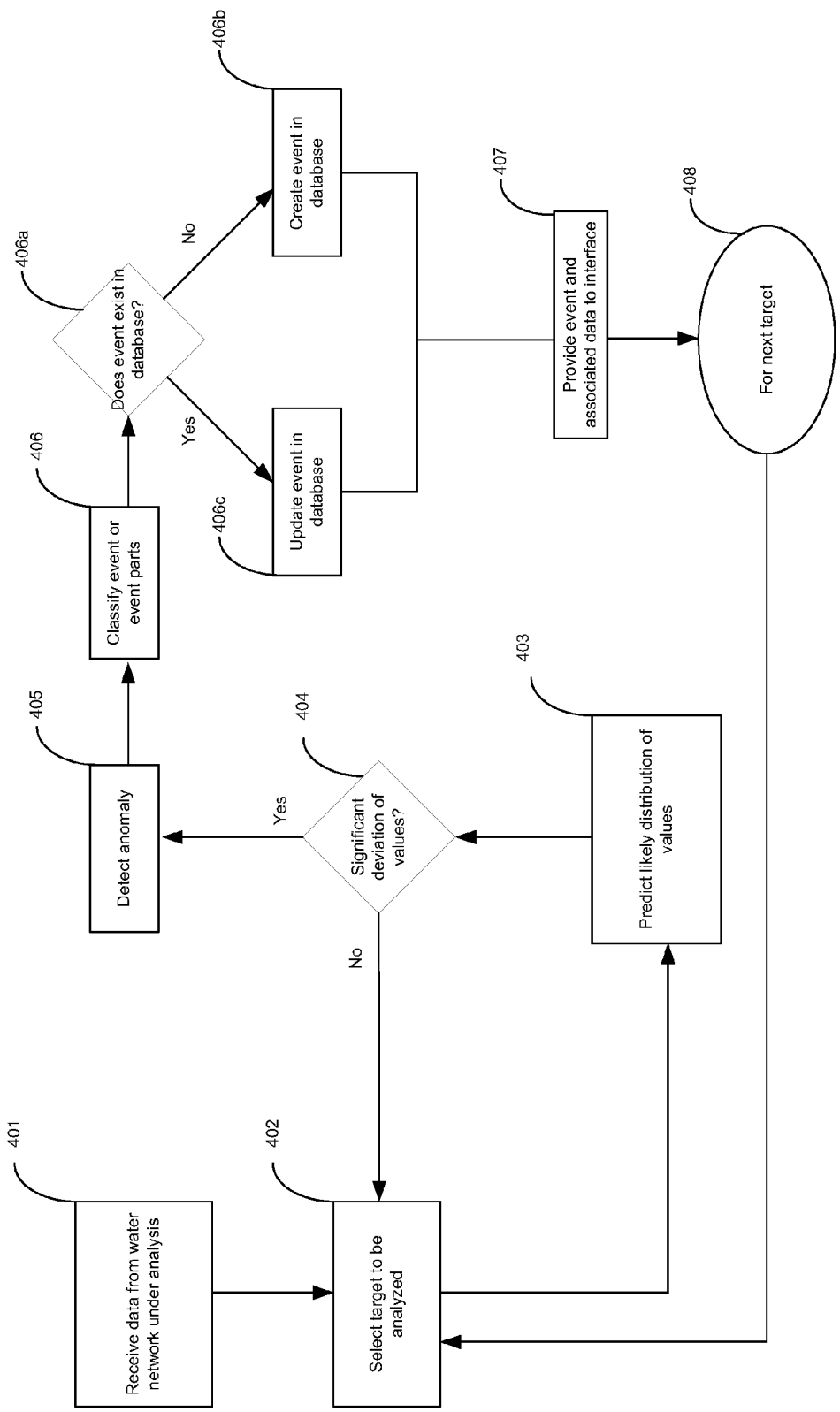
FIG. 4 presents a flow diagram further illustrating a method for monitoring a water network according to an embodiment of the present invention.

FIG. 4 presents a flow diagram illustrating in further detail a method for monitoring a water network according to embodiments of the present invention. In step 401 the system receives data from the water network under analysis; the data including identification and geographical locations of the meters in the network. Next in step 402 the system selects at least one meter to be analyzed. Next, in step 403, the system predicts a likely distribution of values based on the data received in step 401. Embodiments for predicting a likely distribution of values are discussed with respect to FIG. 5. Next, in step 404 the system determines if there exists a statistically significant deviation of values after comparing the predicted values to the actual values. Embodiments for determining the significance of deviations are discussed with respect to FIG. 2. If there is no deviation of values, or the deviation is insignificant, the system proceeds to step 402 and selects another target to be analyzed. If, however, the system determines the deviation of values is significant, the system proceeds to step 405 and detects an anomaly.

Next, in step 406 the system classifies the event or event parts. Next, in step 406a the system determines if the event or related event exists in the database. If the event or related event does not exist in the database, the system proceeds to step 406b and creates an event in the database. However, if the event or a related event does exist in the database, the system updates the previously stored event in the database in step 406c. To determine if the detected event exists in the database, the system compares the detected event to active events that were previously stored in the database. An active event may be an event that is still ongoing, such as a leak that was previously detected, but has not yet been repaired. In one embodiment, to determine events that are still active, the system determines if an event, such as a leak, has ended. The system determines if a detected event relates to a previously stored event by looking at the similarity of event types, the start time of the detected event and the previously stored event, that the previously stored event has not ended, the location of the detected event and the previously stored event, or any other data fields that may relate the two or more events as alternate or partial detections of the same physical real-world event. In one embodiment, when the system updates the event in step 406c, the event record remains in the database as the same event, so that users monitoring the previously stored event will observe the detected event and its impact on the status of the previously stored event. Next, in step 407, the system provides the event and associated data to an interface or other system capable of reporting or storing the data. In one embodiment, the associated data provided with the event is data associated with detecting the event. For example, if the system detects and classifies a leak, the associated data provided to a user interface may be a map showing the location of the leak, as well as graphs showing the difference in flow rate over time that prompted the system to issue the event.

In step 408, the system selects the next target to monitor, and the system continues to detect anomalies for other meters in the network.

Figure 5:
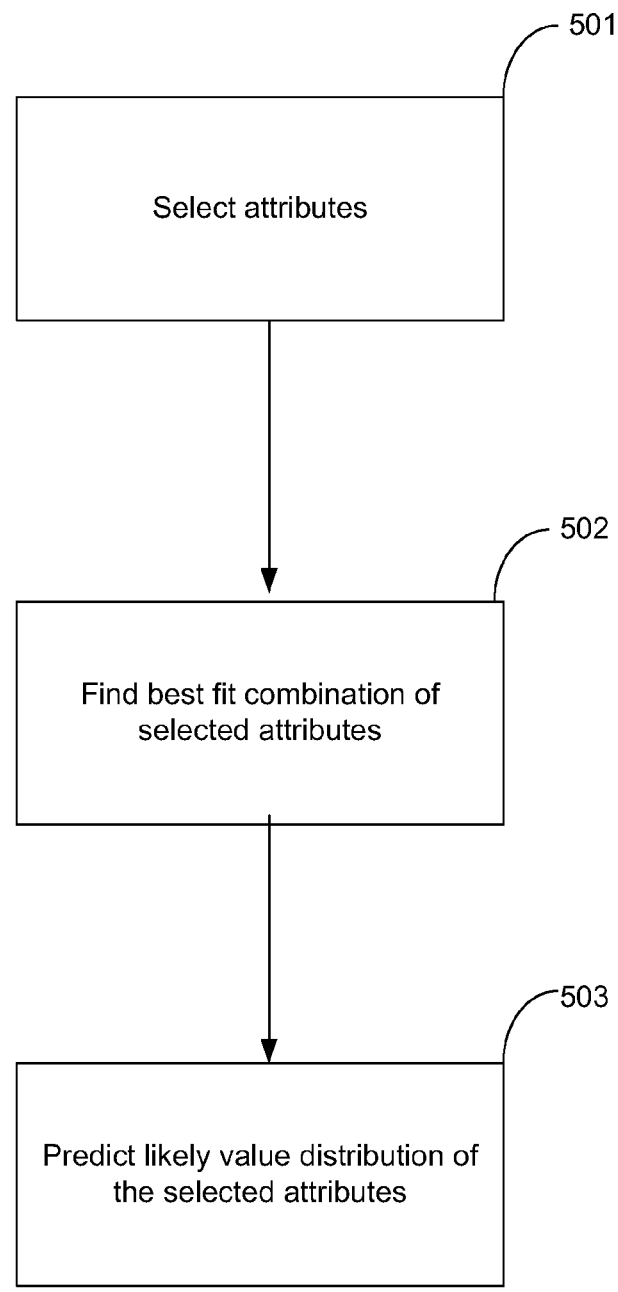
FIG. 5 presents a flow diagram illustrating a method for predicting measured values for a given meter according to an embodiment of the present invention.
Figure 6:
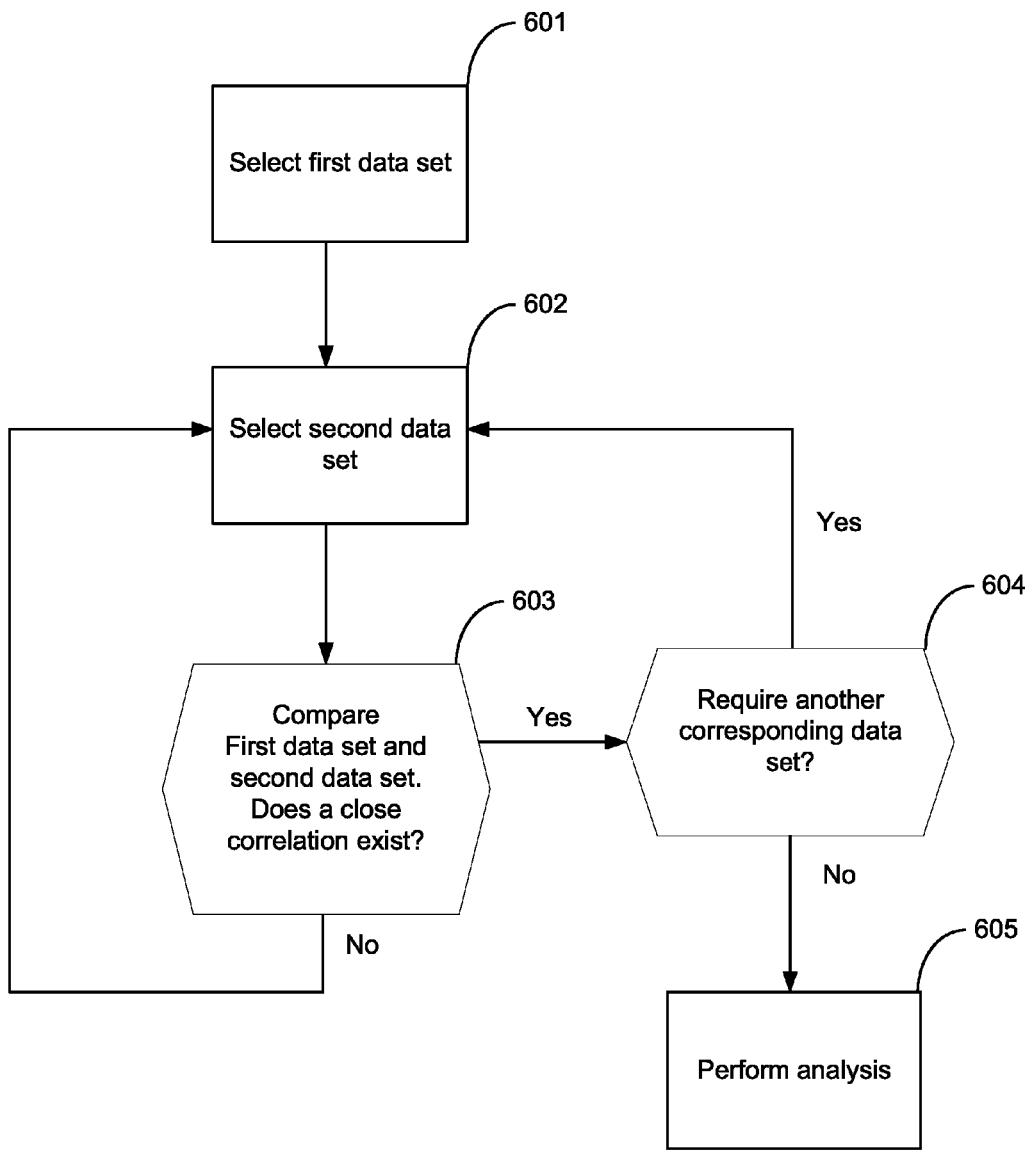
FIGS. 6 and 7 present flow diagrams illustrating attribute selection according to an embodiment of the present invention.

FIG. 5 presents a flow diagram illustrating a method for prediction of values in step 403 of FIG. 4. The system in FIG. 5 performs a prediction by first selecting attributes in step 501. Attributes are, in general, collections of data, such as the historical data from a given meter. Historical meter data may include a meter reading and the corresponding date and time for that meter reading. In one embodiment, the attributes selected are historical meter data for a corresponding meter, or meters, based on a close correlation of the historical data from the meter to be analyzed with the historical data from the corresponding meter or meters selected. FIG. 6 discusses one embodiment of determining corresponding meters based on a close correlation with the historical data from the meter to be analyzed.

Next in step 502, the system may determine the best-fit combination of the selected attributes according to an error metric, e.g. by using linear regression and the root mean squared error (RMSE) metric. The best-fit combination produces a function of the selected attributes which approximates the data set to be predicted.

Next in step 503, the system predicts the likely value distribution of the selected attributes by applying the function obtained in step 502 with data from the selected attributes. The resulting data set includes a likely value distribution for the meter. Next, the resulting data set proceeds from the Predictor in element 205 to a corresponding Anomaly Detector in element 206 of FIG. 2.

Generally, a prediction may be generated by selecting several attributes such as meter data sets and combining them to produce a close approximation of the data set for which a prediction is being generated. In one embodiment, "independent attribute selection," attribute selection proceeds by selecting the N data sets which each, individually, have the best fit with the data set under analysis. By way of example, if the error metric used is the root of mean square error (RMSE), and the attributes are to be combined affinely, then the data sets selected will be the data sets which each, individually, best approximate the data set being analyzed, in terms of the RMSE, under the best fit affine transformation. To this end, the system finds the best fit parameters for each individual data set (with respect to approximating the data set under analysis), and records the approximation error achieved by each data set with optimal parameters; the system selects the data sets with lowest errors (best fit). As one of skill in the art will appreciate, finding the best fit parameters may be accomplished by well-known methods, such as linear regression.

In another embodiment, "exhaustive attribute selection," attribute selection proceeds by selecting the N data sets that minimize the prediction error by exploring all possible N-tuples of data sets available for prediction. For each N-tuple, the system finds the best fit parameters (to approximate the data set under analysis, with respect to a specific error metric such as RMSE), records the approximation error achieved, and selects the N-tuple with lowest error (best fit).

In one embodiment, "incremental attribute selection," attribute selection proceeds by selecting the N data sets one at a time, such that each additional data set provides the greatest reduction in approximation error, when generating the best fit combination of already selected data sets with the new data set. At step K+1, when K data sets have already been selected (K<N), the system determines the K+1 data set to add to them by finding the best fit parameters and recording the approximation error for all collections of K+1 data sets comprised of the K data sets already selected and one of the other data sets available for prediction; the system selects the additional data set which achieves the lowest error (best fit).

Figure 7:
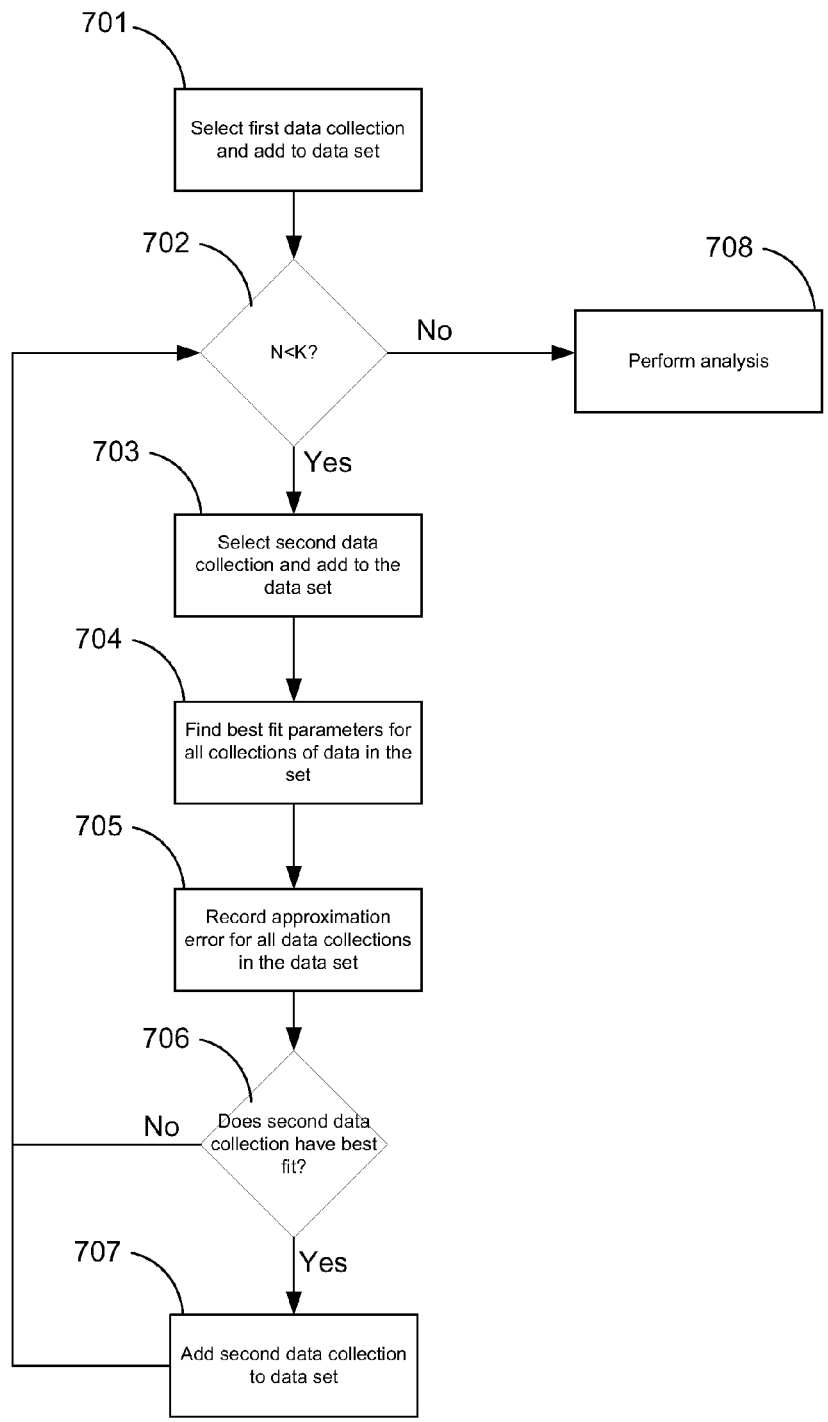

FIG. 7 provides a flow diagram for one embodiment of the "incremental attribute selection". In step 701 the system selects the first data set, or meter data, to add to the selected attributes. The first data set may be selected based on having a high correlation to the meter data being analyzed. Next in step 702, the system determines if another data collection should be added to the data set by determining if N, the number of data sets in the combination, is less than K, the predefined number of data sets the designer has allowed to be combined. If not, the system proceeds to step 708 and performs the analysis. If another data collection is to be added to the data set, the system proceeds to step 703 and selects a second data collection to add to the data set. Next in step 704 the system finds the best fit parameters for all data collections in the data set, and then records the approximation errors for all data collections in the data set in step 705. Next in step 706 the system determines if the added data set achieves the lowest error by determining the best fit. If the added data set does not achieve the lowest error, the system proceeds to step 702. However, if the second data collection did achieve the lowest error, the system proceeds to step 707 and adds the second data collection to the data set. The system then proceeds to step 702.

Following each of these embodiments of attribute selection, parameter selection then proceeds by any of the methods familiar to one of skill in the art, such as linear regression, to generate the best-fit affine combination of all the selected data sets, in terms of the error metric being used (e.g., the RMSE). In one embodiment, several different regressions or regression methods are employed in parallel, and the result is the median or average or similar combination of individual regression results.

As one skilled in the art will be aware, "Independent attribute selection" is computationally the fastest but least accurate of these embodiments, "Exhaustive attribute selection" is computationally the slowest but most accurate, and "Incremental attribute selection" may provide an intermediate level of accuracy with intermediate computational speed.

Generally, the data sets which are available for use in generating predictions include all or some of the meter data sets received by the system, such as all the time series of meter readings and transformations of those data sets such as time shifts of the time series of meter readings. In one embodiment, the data sets which are available for prediction (the attributes from which attribute selection must choose N sets) are the data sets for meters other than the meter under analysis, and certain time-shifts of the data set for the meter being analyzed and other meters. The time-shifts correspond to multiples of the cycle periods expected in the data, such as one day, one week, and one year. By way of example, the other meters whose data sets are considered may be the entire collection of available meters, or the collection of meters which measure the same quantity (e.g. flow meters, if the meter under analysis is a flow meter), or only meters which are located remotely from the meter under analysis, such that a local event registered by the meter under analysis is unlikely to propagate hydraulically through the network to any of the remote meters.

In some embodiments, the meter data used may be a processed version of the original meter data received, and may be further restricted in time from the entire historical data. For example, the data sets used for the above analysis may be the average meter values calculated over consecutive 6-hour periods (one average value for each meter for every 6 hours), starting 70 days before current time, and ending 7 days before current time. This could, for example, remove any unwanted effect of recent dissimilarity between meters, caused by an ongoing effect which is to be detected; any irrelevant dissimilarity which may have existed a long time ago (such as during another season); and short in-day differences.

FIG. 6 presents a flow diagram illustrating a method for selection of corresponding data for a corresponding meter prediction. FIG. 6 represents a simple subcase of the selection algorithms set forth above, in which a single data set from a separate meter is selected as the corresponding data set. This makes use of the observation that distant meters may usually not be affected by the same local events, such as a leak downstream of one of the meters, but may be similarly affected by global consumption or network events (such as a warm day or sports event), thus preventing many potential false alerts. In step 601 the system selects a first data set including historical data from a meter. The historical data includes pressure and flow values and the time associated with the pressure and flow readings. Next, in step 602 the system selects a second data set, the second data set including historical data from a meter. In one embodiment the second data set is historical data from a network device physically different and not strongly connected hydraulically to the network device represented by the first data set. For example, the first data set is associated with a meter located in Manhattan, and the second data set is associated with a meter located in Queens. Locations chosen may be remote enough or otherwise sufficiently removed from the meter being analyzed such that the data sets are not hydraulically connected, and therefore not affected by the same anomaly or event, e.g., their water flow is not affected by the same leaks, water quality changes in one would not affect the other, and the like. However, although the second data set will not be affected by the same local hydraulic event, both data sets may still be affected by the same regional or global event, such as a warm day, or a city-wide sporting event. In another embodiment, the second data set is a data set from a different time period of the same meter represented by the first data set. For example, the first data set is from meter 1, and the second data set is also from meter 1 but represents data from three days prior.

Next, in step 603 the system compares the historical data of the first data set with historical data of the second data set to determine if a close correlation between the two meters exists. A correlation may be determined according to standard correlation techniques known in the art. Some existing correlation techniques known in the art are described in Miles, Jeremy and Shevlin, Mark, *Applying Regression and Correlation: A Guide for Students and Researchers*, Sage Publications Ltd. (2000), ISBN 0761962301. A correlation may be considered close if the correlation value exceeds a predetermined threshold, in which case the system proceeds to step 604. For example, if the correlation metric used is R-squared (also called the coefficient of determination), which ranges from 0 to 1, then the system may recognize the meters as corresponding meters if the calculated R-squared is above a predefined value such as 0.9 In step 604 the system determines if another corresponding data set may be required. In one embodiment, another corresponding data set may be required to facilitate more accurate anomaly detection, and the system proceeds to step 602. If no corresponding data set is required, the system performs analysis in step 605, and as discussed with respect to FIG. 5.

However, returning to step 603, and in another example, if the correlation value is lower than the threshold, the system may recognize that the data sets do not closely correlate, in which case the system proceeds to step 602 and another data set is selected.

In some embodiments, the data used by a predictor may include other forms of data available to the Network Analysis Engine, such as Operation and External Data, described above. Such data may be used, for example, to further restrict, enhance, or categorize the meter data. By way of illustration, a predictor may use such data so that only data from previous holidays (not regular workdays) is used to predict values for a current holiday, or to cancel out the effects of unseasonal weather, known network events, or temporary network changes.

Figure 8:
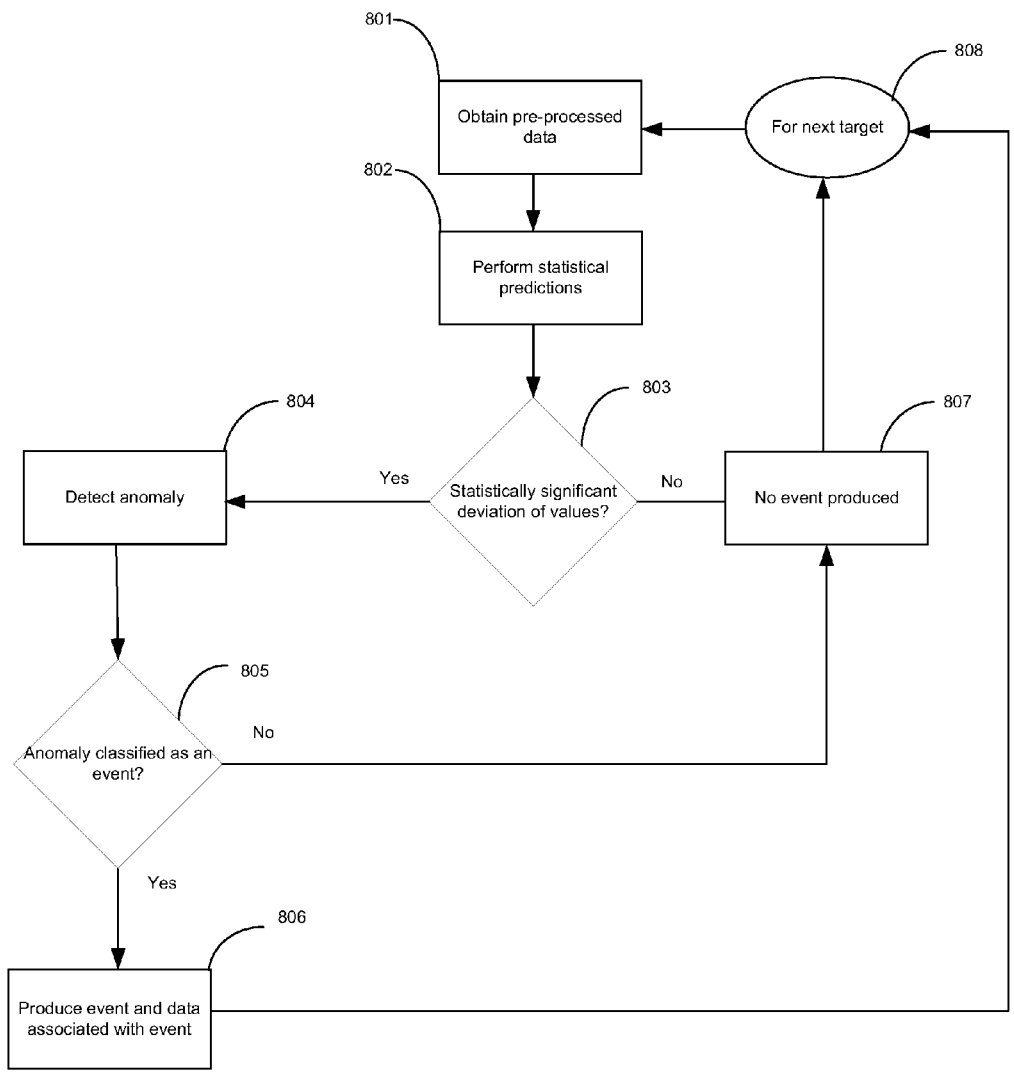
FIG. 8 presents a flow diagram illustrating a method for detecting a water leak event.

FIG. 8 presents a flow diagram illustrating a method for detecting and registering a water leak event. In step 801 the system obtains pre-processed data from the water distribution system. Next, in step 802 the system performs N number of statistical predictions according to N number of statistical prediction models. Next, in step 803, and for each predictor, the system compares the prediction data to the actual data to determine if there exists a statistically significant deviation. If no statistically significant deviation exists for the particular predictor, the system proceeds to step 807 and no event is produced. At step 807, the system proceeds to step 808 to select another set of meter data from the water network for analysis. However, in step 803, if a statistically significant deviation exists for the particular predictor, the system proceeds to step 804 and detects an anomaly.

Next, in step 805, the anomaly may be classified as an event according to the discussion of examples provided with respect to FIG. 4. For example, if the system, according to different predictor models, issues an anomaly of a statistically significant continuing increase in flow and an anomaly of a statistically significant short-term reduction in pressure (followed by a pressure correction), the anomalies are classified in step 805 as the beginning of a leak event. At a later point in time, if the system detects a corresponding flow decrease anomaly of similar magnitude, the anomaly is classified as the end of that leak event. Another method of classifying deviations in step 805 is the use of external data to confirm or refute the anomalies detected in step 804. For example, if the day the analysis took place was a holiday, in which, for example, residential water use patterns may change significantly, then large statistical deviations from the predicted data may increase the statistical threshold needed to identify a leak event. In another example, a sporting event may trigger an increased consumption in one area of the network, and the system may be equipped to utilize this information as external data to confirm or refute the existence of an event.

In other embodiments, the system may refute a detected anomaly by applying additional limitations on the data that produces the anomaly. For example, the system, or the network operators, may decide to provide alerts only corresponding to leaks crossing a certain magnitude threshold, having a deviation from expected values lasting for more than a specified period of time, or occurring over a certain frequency over a period of time. The sensitivity of the system to detect leaks may depend at least in part on the user-determined magnitude threshold, or having a leak lasting at least a specified period of time.

Next, in step 806 the system registers an event such as a leak and further provides characteristics of a detected leak. The characteristics may include the magnitude of the leak, the trend or rate of increase of the leak and the total amount of water that leaked so far. The leak alert and characteristics of the leak may be stored in a database-like element 208 in FIG. 2, and may also be reproduced on any of the outputs 210-214 of FIG. 2. After registering an event in step 806, the system proceeds to step 808 to select another set of meter data from the network for analysis.

Figure 9:
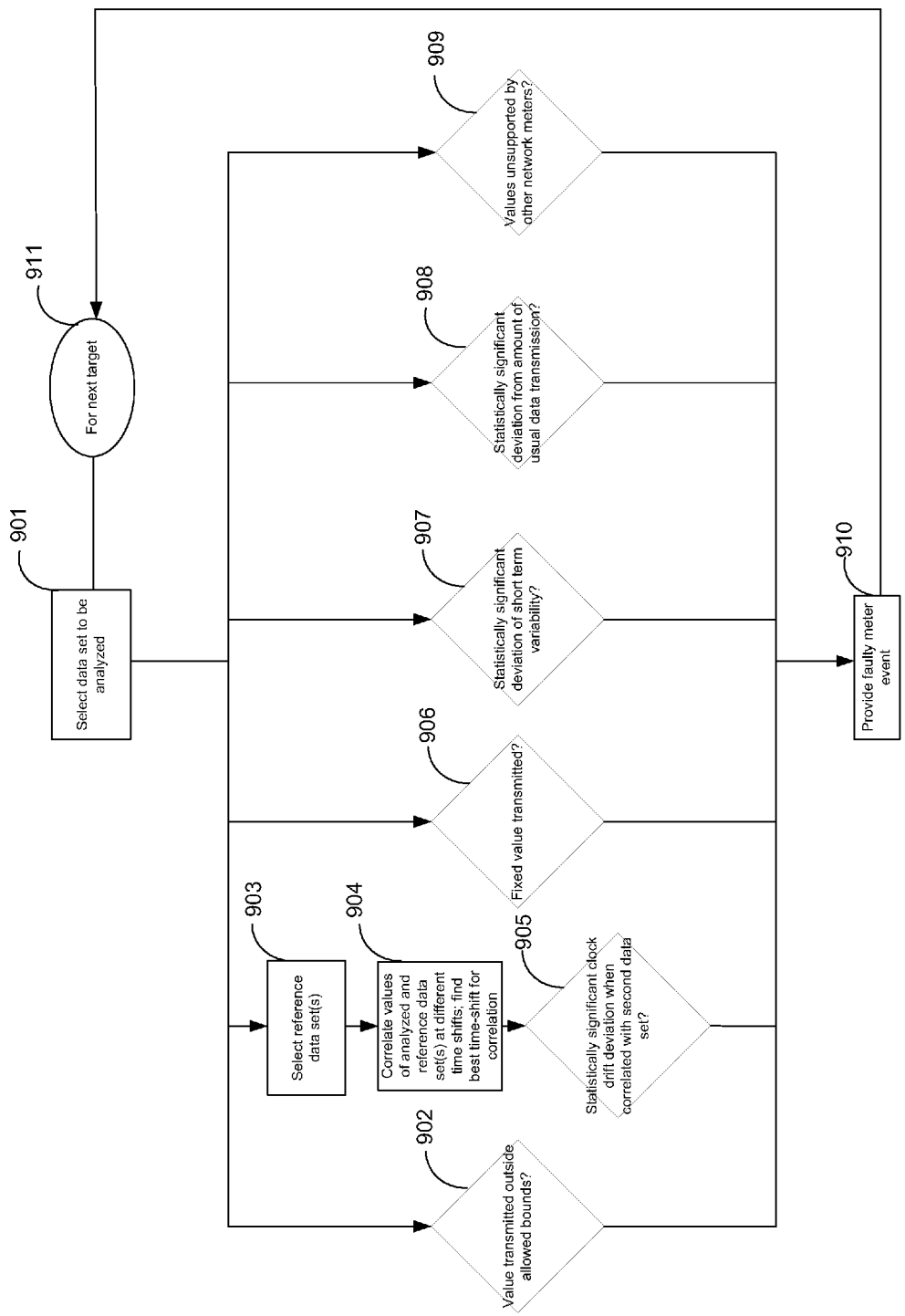
FIGS. 9-11 present flow diagrams illustrating event detection for specific event types according to embodiments of the present invention.

FIG. 9 presents a flow diagram illustrating a method for detecting a faulty meter anomaly. In step 901 the system selects a data set to be analyzed. Elements 902 and 905-909 represent various predictors and anomaly detectors to determine the statistical significance of any deviation of actual and predicted values. One of skill in the art will appreciate that each element 902 and 905-909 or any combination of the elements may be used to determine the likely values and issue an anomaly. Furthermore, the system may proceed by executing any combination of the elements concurrently, or sequentially in any order.

Proceeding with the embodiment illustrated by flow chart in FIG. 9, the predictor and anomaly detectors represented by element 902 determine whether or not there is a statistically significant deviation of the value transmitted, beyond what may be explained by a real network event, such as a leak.

The predictor and anomaly detectors represented by elements 903-905 determine whether or not a statistically significant clock drift deviation exists when the first data set is correlated with a second data set. The predictor and anomaly detectors proceed by selecting a reference data set or multiple sets in step 903, and then correlating the first data set with the reference data set in step 904. The reference data set may include one or more meters which usually have values in close correlation with the meter under analysis. Next the system proceeds to step 905 to determine if the meter exhibits a statistically significant clock drift by searching for the time-shift which produces the best correlation. If the meter does exhibit clock drift (that is, if the best time-shift is significantly different from 0), the system proceeds to step 910 and issues a faulty meter event.

The predictor and anomaly detectors represented by element 906 determine whether a fixed value was transmitted. The system determines if a fixed value, or data that does not change over time, was transmitted in step 904. If the meter transmitted a fixed, almost fixed, or frequently fixed value, for an abnormally long time, the system proceeds to step 910 and issues a faulty meter event.

The predictor and anomaly detectors represented by element 907 determine whether or not the short term variability is too high or too low. If the short term variability is too high or too low, the system proceeds to step 909 and issues a faulty meter alert.

The predictor and anomaly detectors represented by element 908 determine whether or not there is a statistically significant deviation from the amount of usual data transmitted. If considerably less or more than usual data was transmitted, then the system produces an anomaly. For example, if no value was transmitted by the meter for three days, the system produces an anomaly. However, if the deviation between the amount of data predicted to be transmitted and the actual data transmitted is not statistically significant, no anomaly is produced.

The predictor and anomaly detectors represented by element 909 determine whether or not the values are unsupported by other network meters. For example, conservation of mass may indicate that the reading at a first flow meter must be greater than the reading at a second flow meter downstream of it, or the sum of several other meter readings. If such "impossible" values are found, the system proceeds to step 910 and issues a faulty meter event.

After providing an event in step 910, the system selects the next target to analyze in step 911 and continues to analyze the network for other faulty meters.

Figure 10:
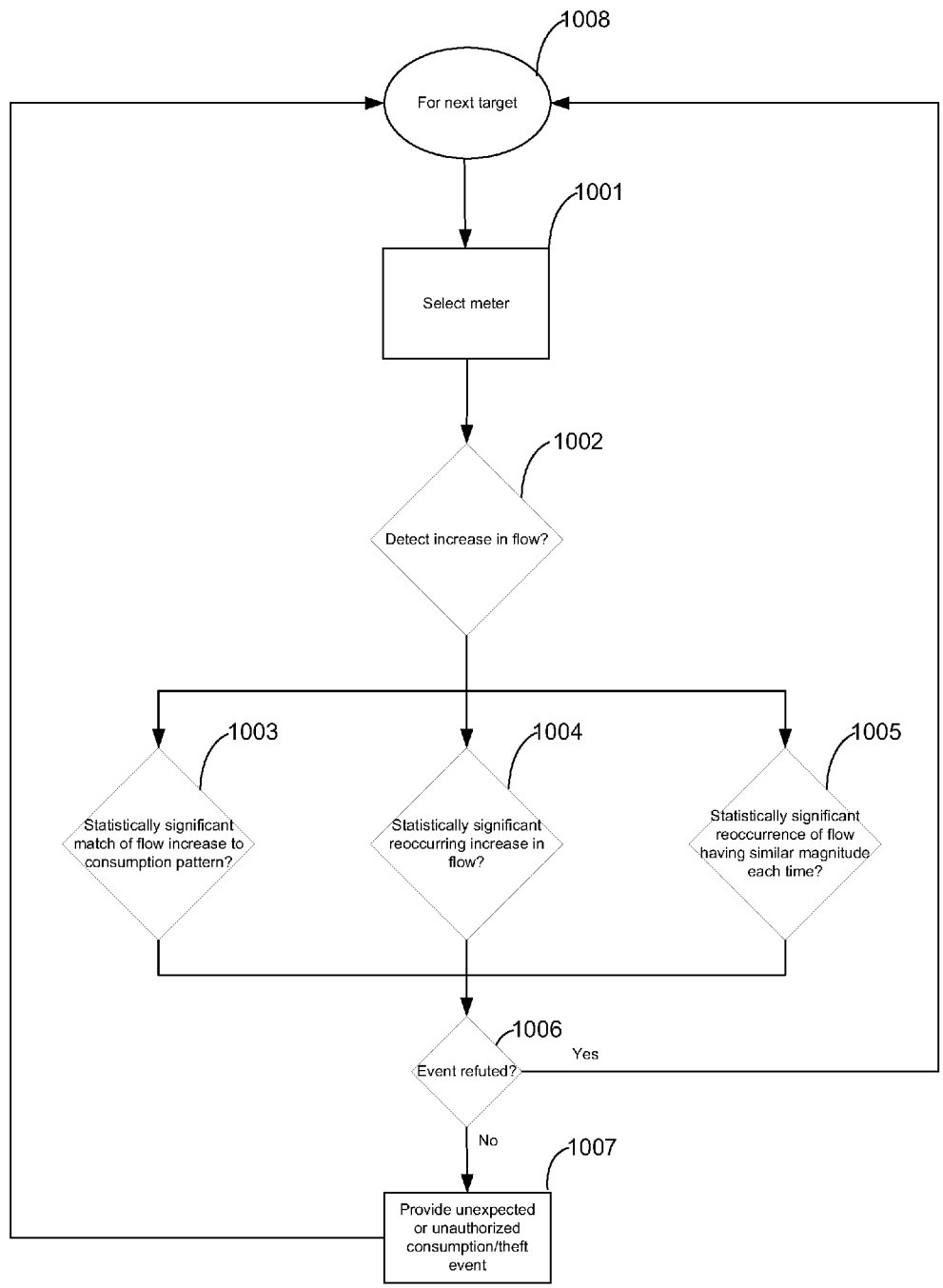

FIG. 10 illustrates a flow diagram depicting an embodiment for providing an unexpected consumption or theft anomaly. Elements 1003-1005 represent various predictors and anomaly detectors to determine the statistical significance of any deviation of actual and predicted values. One of skill in the art will appreciate that each element 1003-1005 or any combination of the elements may be used to determine the likely values and issue an anomaly. Furthermore, the system may proceed by executing any combination of the elements concurrently, or sequentially in any order.

In step 1001 the system selects a meter of a water network to analyze for an unexpected water consumption or water theft. In another embodiment, the system selects a section of a water network, or an entire water network to analyze for an unexpected water consumption or water theft. Next, in step 1002 if the system detects an increase in flow of the selected meter or network section the system proceeds to further categorize the anomaly, represented by elements 1003-1005. In one embodiment the system may detect an increase in flow over the historical meter data and apply the statistical analysis outlined with respect to FIG. 2. In another embodiment the system may detect an increase in flow by analyzing real time data from the meter.

The predictor and anomaly detectors represented by element 1003 determine whether or not there is a statistically significant match of flow increase to the consumption pattern. In step 1003 the system may analyze the current flow increase with a previously stored consumption pattern. The previously stored consumption pattern may include meter or network data for the past year, or any other time frame to facilitate analysis of determining a consumption pattern. If the flow increase matches the consumption pattern, the system proceeds to step 1006 to determine if the event can be explained by another factor.

The predictor and anomaly detectors represented by element 1004 determine whether or not there is a statistically significant reoccurring increase in flow in similar hours. For example, the system analyzes historical data for the meter or system to determine the periodicity of the consumption pattern. If there exists a reoccurring increase in flow, and this did not occur further in the past, the system proceeds to step 1006 to determine if the event can be explained by another factor.

The predictor and anomaly detectors represented by element 1005 determine whether or not there is a statistically significant reoccurring flow having a similar magnitude each time. In one embodiment, the system compares the periods of increased flow with other historical flow data of the meter or network to determine a nearly-constant increase in the magnitude of flow during reoccurring periods. If the system detects similar magnitudes each time, and this did not occur further in the past, the system proceeds to step 1006 to determine if the event can be explained by another factor.

In step 1006 the system determines if a detected event can be refuted by external or operation data. In one example, the system analyzes operation data to determine if there was an authorized entrance to the site under analysis. In another example, the system refutes a detected event if a flow increase at one meter and a corresponding flow decrease of similar magnitude at another meter for the same region indicates a change in flow, but not a change in total consumption in that region. If the system does not refute the detected event in step 1006, the system provides an unexpected or unauthorized consumption or theft event in step 1007. However, if the system does refute the event, the system proceeds to step 1008. Next, in step 1008, the system selects the next target to analyze and continues to analyze the network for other unexpected or unauthorized consumption or theft events.

Figure 11:
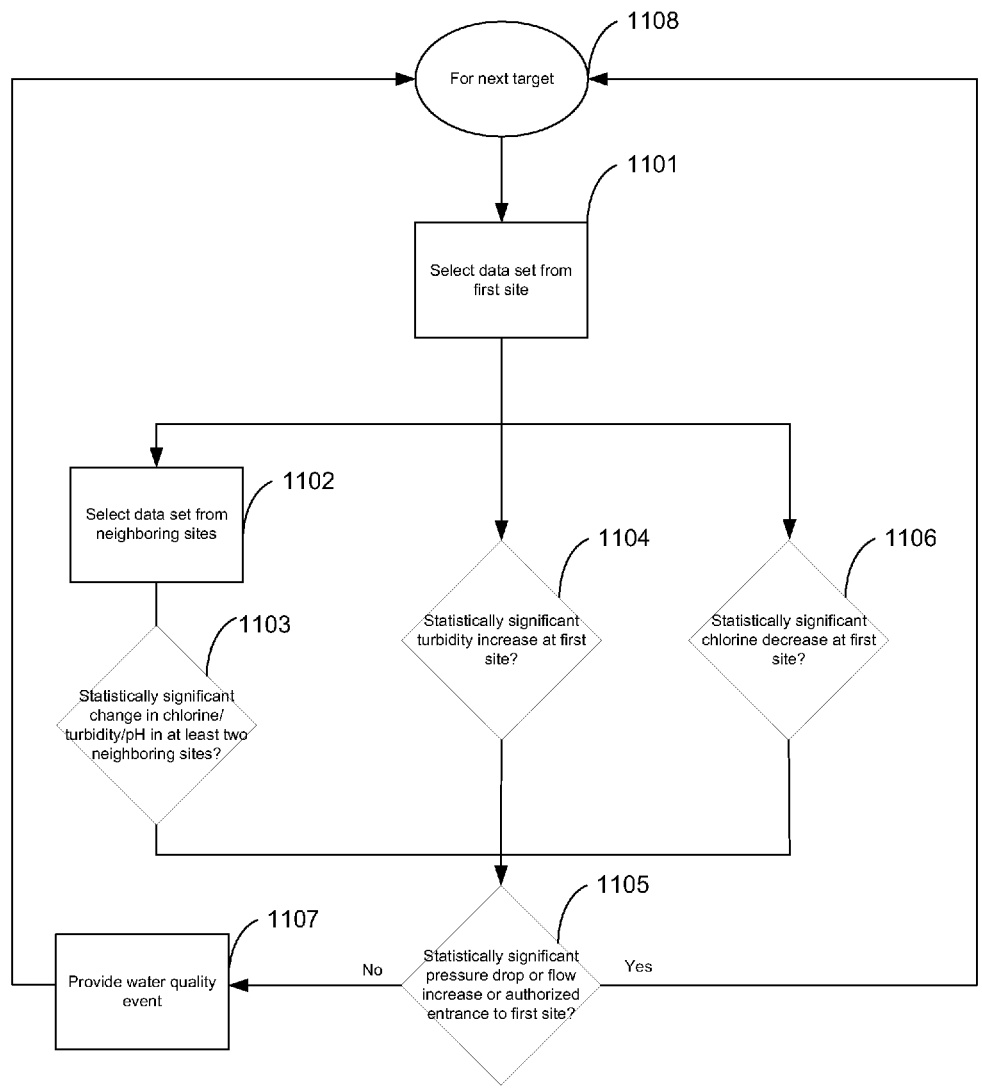

FIG. 11 illustrates a flow diagram depicting an embodiment for providing a water quality anomaly alert. In step 1101 the system selects a data set from the first site to be analyzed. Elements 1103, 1104, and 1106 represent various predictors and anomaly detectors to determine the statistical significance of any deviation of actual and predicted values. One of skill in the art will appreciate that each element 1103, 1104, and 1106 or any combination of the elements may be used to determine the likely values and issue an anomaly. Furthermore, the system may proceed by executing any combination of the elements concurrently, or sequentially in any order.

The predictor and anomaly detectors represented by element 1103 determine whether or not there is a statistically significant change in the chlorine, turbidity, or pH in at least two sites selected in step 1102, the change being in excess of a predefined threshold set by the water network managers. The system may select at least two or more neighboring sites in step 1102. The number of sites selected may further assist the system to more accurately predict a water quality anomaly. If the system detects a change in step 1103, the system proceeds to step 1105 to decide if the event should be reported.

The predictor and anomaly detectors represented by element 1104 determine whether or not there is a statistically significant turbidity increase at the selected meter from the selected site, and if so, the system proceeds to step 1105 to decide if the event should be reported.

The predictor and anomaly detectors represented by element 1106 determine whether or not there is a statistically significant chlorine decrease at the same site. If there exists a chlorine decrease at the site, the system proceeds to step 1105 to decide if the event should be reported.

In step 1105 the system receives events from elements 1103, 1104, and 1106 and determines if the events should be reported, or disqualified. One reason to disqualify an event is if there exists a statistically significant pressure drop, flow increase, or an authorized entrance to the site selected in step 1101. In one embodiment an authorized entrance to the site may include a repair to the site by a construction crew, which may result in a temporary turbidity increase at the selected meter. A significant short-term pressure drop, for example, may indicate a leak event or network intervention, which should be taken to be the root cause of what otherwise appears to be a quality anomaly. However, because a repair may be relatively brief, the system may not wish to provide an anomaly alert due to a temporary repair, and the system proceeds to step 1108 to select another data set to analyze. If the system does not detect a pressure drop, flow increase, or authorized entrance to the site, the system proceeds to step 1107 and provides a water quality event. After providing an event in step 1107, the system selects the next target to analyze in step 1108 and continues to analyze the network for other water quality events. One of skill in the art will appreciate that other embodiments may similarly process other water quality parameters and indicators, taking into account the network events and activities which may temporarily affect those other parameters.

Figure 12:
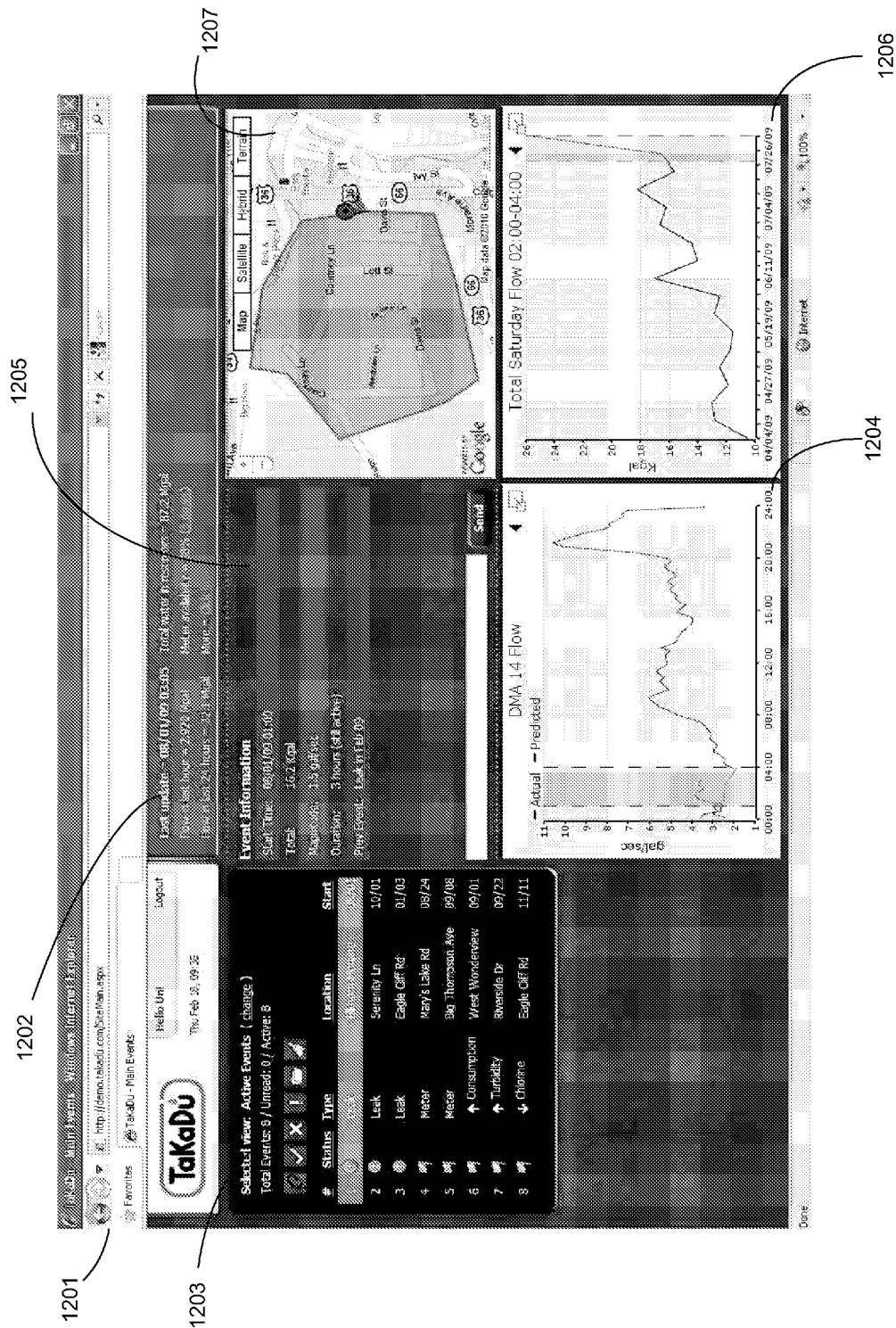
FIGS. 12-15 present screenshots showing a web user interface presenting event information generated by the analysis engine according to one embodiment of the present invention.

FIG. 12 illustrates a screenshot of the user interface ("UI") generated by the event tracking interface according to one embodiment of the present invention. The screen in FIG. 12 displays detected events and their associated information to a user. The user may, for example, be a worker at a water utility network tasked with monitoring the water network under analysis. FIG. 12 includes UI screenshot 1201 which includes sections for update status 1202, events list panel 1203, graph 1204, event information 1205, graph 1206, and map 1207.

In one embodiment, UI 1201 is a web page viewable to a user over a network or the internet. Additionally, update status 1202 informs the user of the last date and time that the system monitored the water network for anomalies. Events list panel 1203 provides the user with a listing of previously detected events, the dates, times, locations, and status of the events. Further to the embodiment, the events list panel 1203 further allows the person viewing the user interface 1201 to select an event in the events list panel 1203. Detailed information associated with the selected event is reproduced as event information 1205, graphs 1204 and 1206, and map 1207. Event information 1205 includes, for example, a start time of the anomaly, an end time of the anomaly, a magnitude of the anomaly, a total water loss associated with the anomaly, and any comments supplied by users of the system. Comments supplied by users or the system may also provide hyperlinks to other events stored by the system. Graphs 1204 and 1206 include detailed information about the user-selected event such as a visual comparison of the actual and predicted (routine) flow of water at a relevant meter. Additionally, the user interface 1201 utilizes GIS data associated with the selected event to show the location of the event on map 1207. In one embodiment, the event is associated with a specific meter, and the location of the meter is produced on the map 1207. The event map 1207 may also be enabled to display an area of the network affected by the detected event, or an estimated area within which the exact event location is statistically likely to be contained.

Database 208 or even Event Decision and Classification Engine 207 from FIG. 2 may host an interactive software application that associates meter data, alerts, reports, statistical analysis and a map of the water network with a user interface to allow a user of the system to easily discern the location of a water leak or other event. A user interface may be hosted on Database 208, and presented to any number of interfaces represented by element 209. In another embodiment, Event Decision and Classification Engine 207 is operative to send information directly to elements 210, 211, 212, 213, 214.

Figure 13:
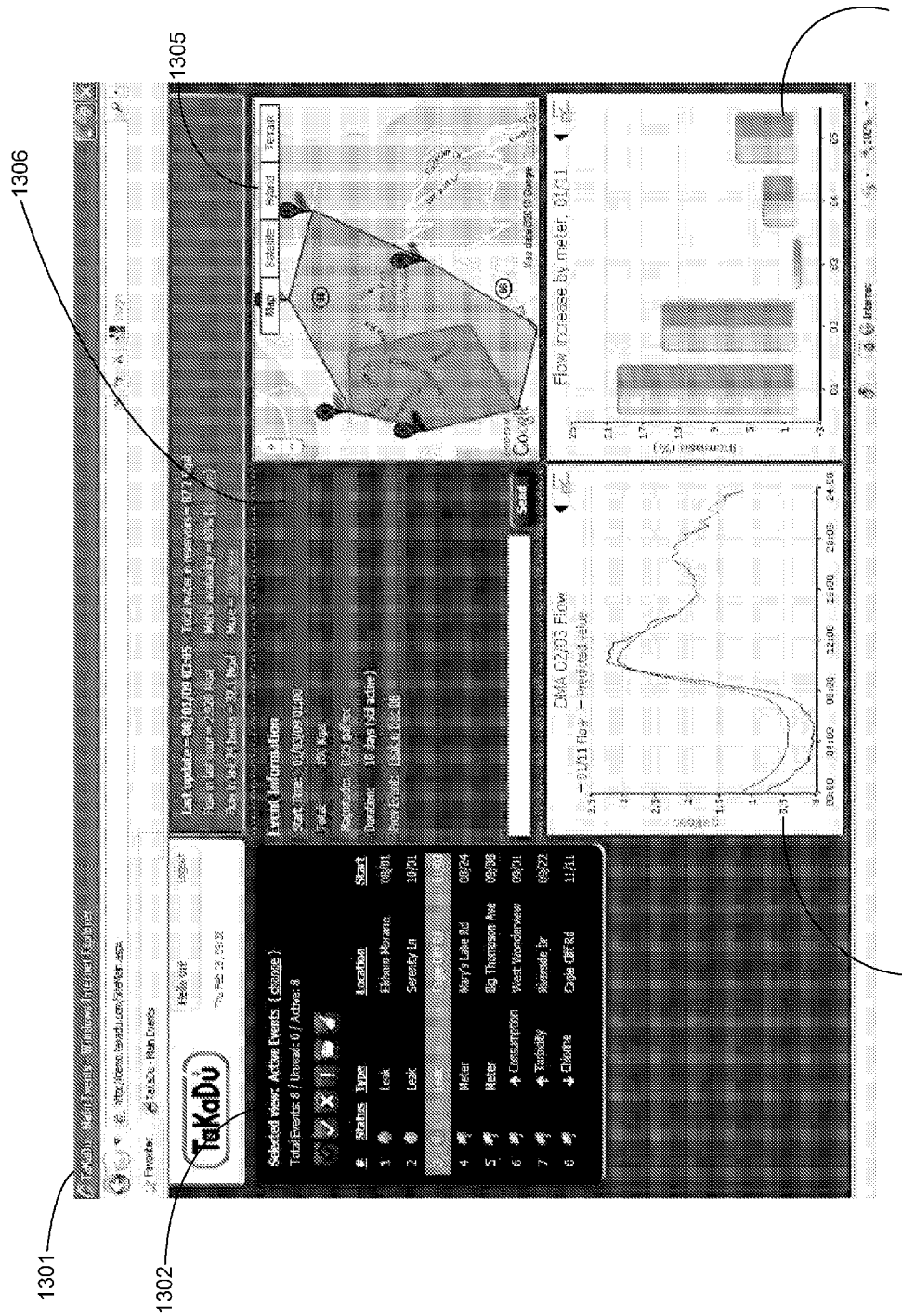

FIG. 13 illustrates a screenshot of the UI generated by the event tracking interface according to one embodiment of the present invention. The screen in FIG. 13 displays detected events and their associated information to a user. The user may, for example, be a worker at a water utility network tasked with monitoring the water network under analysis. FIG. 13 includes UI 1301 which includes events list panel 1302, graphs 1303 and 1304, map 1305, and event information 1306.

In one embodiment, UI 1301 is a web page viewable to a user over a network or the internet. Additionally, events list panel 1302 provides the user with a listing of previously detected events, the dates, times, meter locations, and status of the events. Further to the embodiment, the events list panel 1302 further allows the person viewing UI 1301 to select an event in the events list panel 1302. Detailed information associated with the selected event is reproduced as event information 1306, graphs 1303 and 1304, and map 1305. The user interface 1301 utilizes GIS data associated with the selected event to show the location or approximate location of the event on map 1305. In one embodiment, map 1305 is operative to display the location of multiple meters registering an event.

Figure 14:
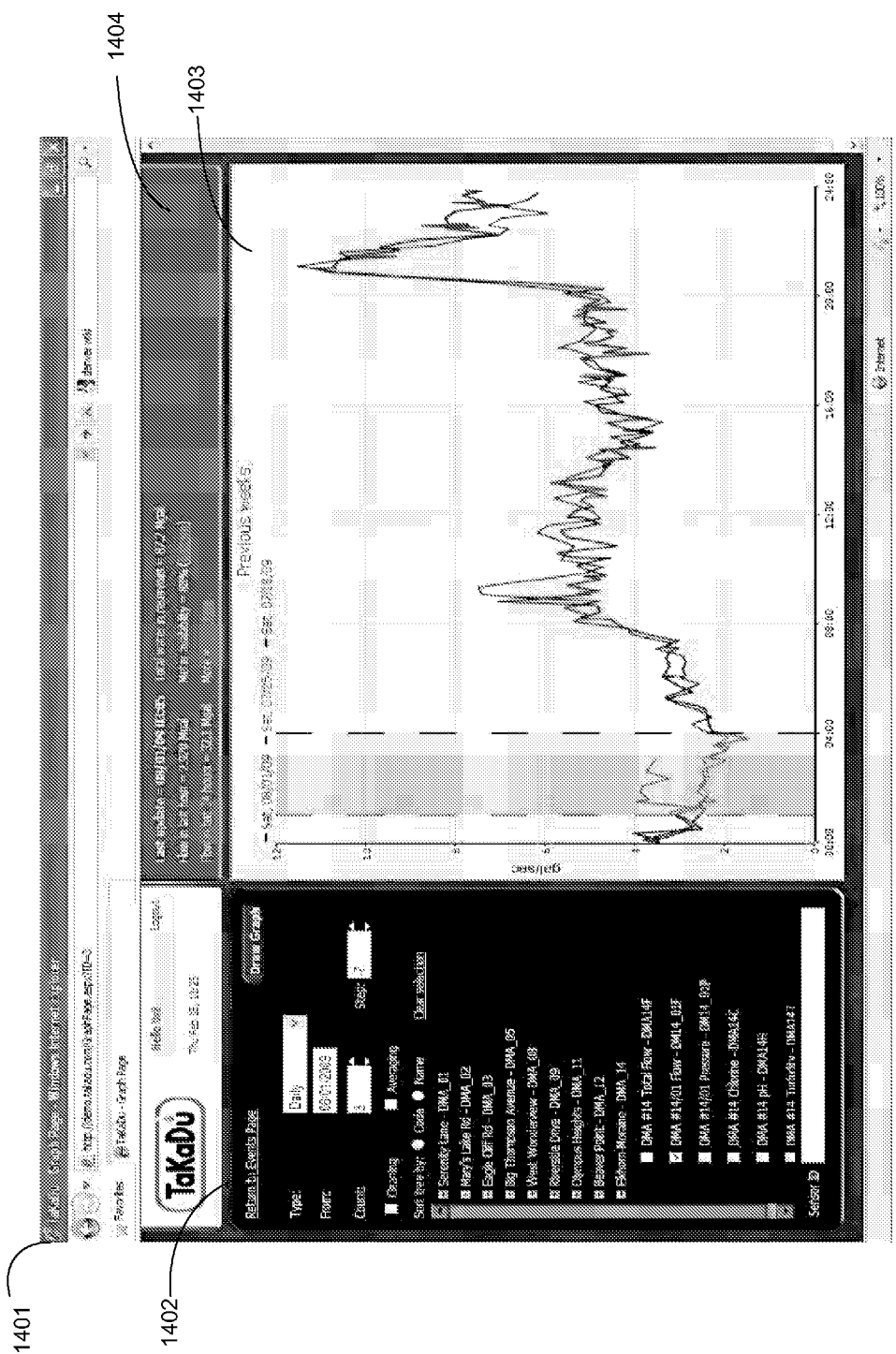

FIG. 14 illustrates a screenshot of another UI generated by the events tracking interface according to one embodiment of the present invention. The screen in FIG. 14 displays data associated with a detected event or selected meter or region of the network. The user may, for example, be a worker at a water utility network tasked with monitoring the water network under analysis, and more specifically. FIG. 14 represents a graph module depicting data collected by the system, and allowing the user to further explore, customize, and change the graphs provided by the system for each event, or to independently explore the data through various visualizations and using some of the system's pre-processing capabilities. FIG. 14 includes UI 1401, meters list and graph control panel 1402, graph 1403, and update status 1404. In one embodiment, UI 1401 is a web page viewable to a user over a network or internet. The user of UI 1401 may select one or more meters and a variety of graph types from meters list and graph control panel 1402. Data associated with the selected meter(s) may be produced in graph 1403. Data produced in graph 1403 may be any information obtained by the system. Update status 1402 informs the user of the last date and time that the system monitored the water network for anomalies.

Figure 15:
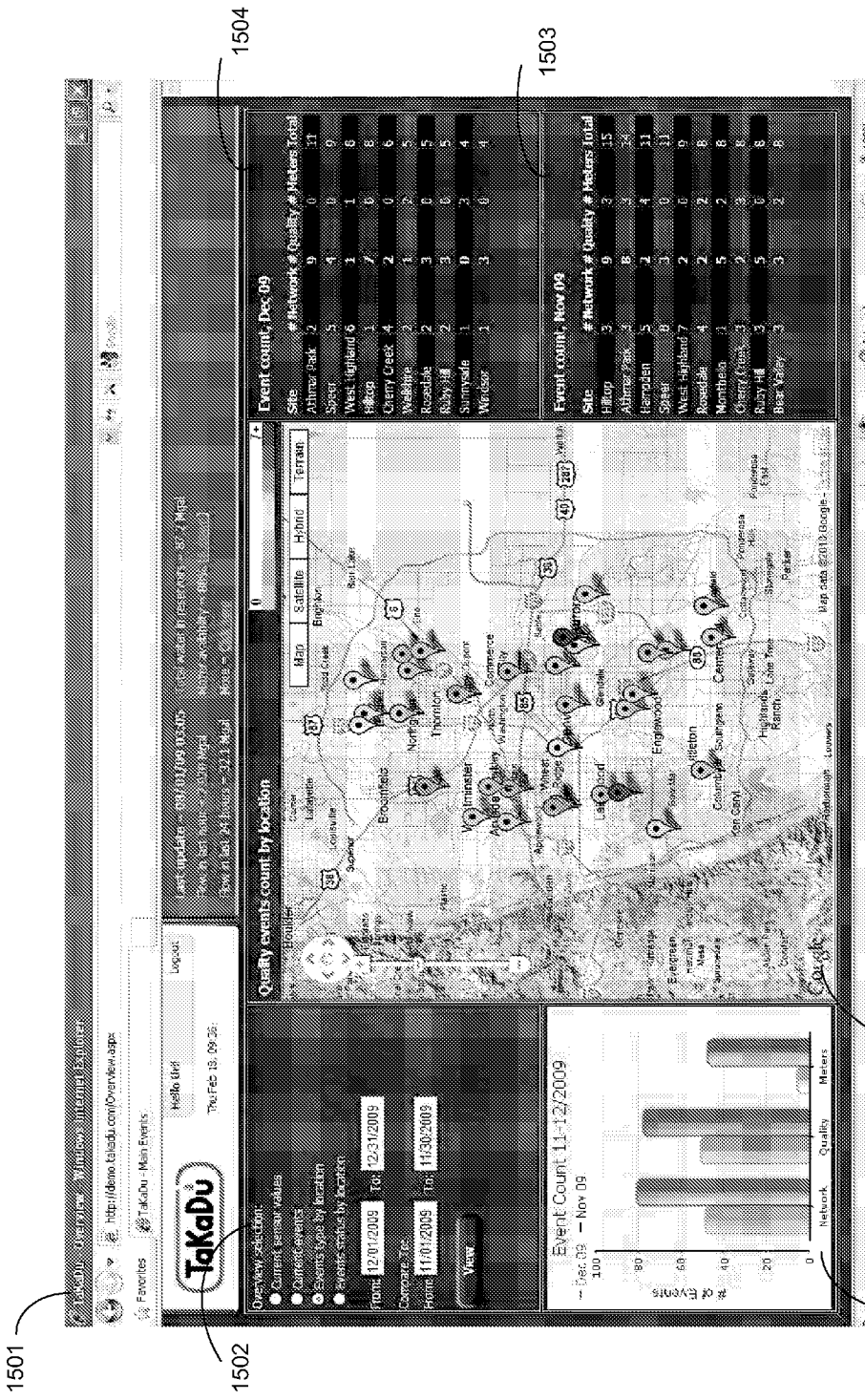

FIG. 15 illustrates a screenshot of the UI generated by the reports interface according to one embodiment of the present invention. The screen in FIG. 15 displays an aggregate overview of the detected events and their associated information to a user. The user may, for example, be a worker at a water utility network tasked with monitoring the water network under analysis. FIG. 15 includes UI 1501, overview selection panel 1502, event count panels 1503 and 1504, map 1505, and graphs 1506.

In one embodiment, UI 1501 is a web page viewable to a user over a network or the internet. Additionally, overview panel 1502 provides the user with options to display an aggregation of events over a selected time period. The user may choose the display of events based on meter values, events, dates, and status of the events. Detailed information associated with the user selection in overview selection panel 1502 is reproduced as event count panels 1503 and 1504, map 1505, and graphs 1506. Overview selection panel 1502 allows the user to sort and filter events by their various fields and characteristics, for example, to view only recent and unresolved events, events sorted by type, and to update event statuses and other workflow characteristics. This follows software industry standards, well known to one skilled in the art.

Event count panels 1504 and 1505 display the number of events, event types, and locations according to a time period. In one embodiment, event count panels 1504 and 1505 display events corresponding to different time periods, allowing a user to compare and contrast the network behavior over time. Map 1505 displays the location and other information of events occurring or that have previously occurred in an area. In one embodiment, the map depicts events and highlights areas with multiple events: locations with few events may be colored green, while locations with many events may be colored red. Graphs 1506 operate to display the evolution of the number and types of events over a time period. In one embodiment, graphs 1506 depict the types and numbers of events occurring during two consecutive months, for example allowing the user to compare and analyze recent trends. One of skill in the art will appreciate that any information collected by the system may be reproduced on graph 1506 to better assist a user tasked with monitoring the water distribution network.

FIGS. 1 through 15 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

It should also be understood that the invention applies not only to water utility networks, but to any type of distribution system. Other types of distribution systems may be: oil, wastewater or sewage, gas, electric, telephony, or other energy delivery systems which involve fluid or flowing resources from one area to consumers. Indeed, the invention may be applied to any distribution or collection system having meters or sensors at arbitrary locations in the network measuring distribution parameters such as flow, pressure, quality or the flow of data itself.

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein.

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

We claim:

1. A computerized method for analyzing resource distribution throughout a network, the method comprising:
  receiving meter data, the meter data representing a plurality of parameters measured by a plurality of meters positioned within a resource distribution network;
  receiving secondary data from one or more sources external to the meters, the secondary data representing one or more conditions affecting a condition of network assets in a region serviced by the resource distribution network;
  statistically predicting meter data for at least one meter based on secondary data;
  comparing the received meter data with the likely distribution of predicted values to detect one or more anomalies if the received meter data deviates from the likely distribution of predicted values;
  identifying a resource distribution network event on the basis of the detected anomalies wherein identifying the resource distribution network event comprises identifying a faulty meter event by:
    receiving a first data set representative of a first meter to be analyzed,
    receiving a reference data set representative of a physically separate second meter,
    correlating the first data set with the reference data set,
    determining a time shift based on the correlation of the first data set with the reference data set, and
    issuing a faulty meter event based on a statistical significance of the time shift; and
  reporting the resource distribution network event.

2. The method of claim 1, comprising:
  selecting at least one parameter from the plurality of parameters; and
  predicting, based on linear regression and a root mean square error metric, the likely distribution of predicted values using a function of the selected at least one parameter that approximates the predicted values.

3. The method of claim 1, wherein statistically predicting meter data comprises identifying historical data associated with a second meter comprised of:
  selecting a data set generated from the second meter among available data sets generated from other meters; and
  minimizing a prediction error by analyzing all possible combinations of available data sets.

4. The method of claim 3, wherein selecting a data set among available data sets comprises:
  finding a best fit parameter of the selected data set;
  finding an approximation error achieved of the selected data set; and
  selecting at least one data set among the available data sets with the lowest approximation error.

5. The method of claim 1, wherein receiving meter data includes receiving data selected from the set consisting of: an individual meter, a collection of meters, and a collection of meters measuring a same type of data.

6. The method of claim 1, further comprising associating data with each network event, the associated data selected from the set consisting of: a start time of the event, an end time of the event, a magnitude of the event, an accumulated magnitude of the event, and a proportion of the event.

7. The method of claim 1, further comprising detecting an anomaly if an area under a curve of a difference between the received meter value and a predicted meter value exceeds a predefined threshold.

8. The method of claim 1, further comprising associating one or more resource distribution network events with each other based on an event type, a start time of the one or more resource distribution network events, or location of the one or more resource distribution network events.

9. The method of claim 8, further comprising using the association between one or more resource distribution network events to classify a start of an event, an end of an event, or a relationship between events.

10. The method of claim 1, further comprising:
  associating the one or more anomalies with a statistical confidence level;

adjusting the statistical confidence level based on the secondary data; and classifying the anomaly as a resource distribution network event based on the statistical confidence level exceeding a threshold.

11. The method of claim 1, further comprising identifying an unexpected consumption event, wherein identifying the unexpected consumption event comprises:

detecting an increased flow reading of a meter;

calculating a statistical significance of at least one of the increased flow reading of the given meter, a consumption pattern, a reoccurrence of the increased flow reading, and a magnitude of each reoccurrence of the increased flow reading; and comparing the calculated statistical significance to the secondary data, the secondary data used to verify or refute the unexpected consumption event.

12. The method of claim 1, further comprising identifying a water quality event, wherein identifying the water quality event comprises:

identifying water quality data present within the meter data, wherein the water quality includes at least one of measured chlorine, turbidity, and pH;

detecting a statistically significant change in the water quality data; and comparing the detected statistically significant change to the secondary data, the secondary data used to verify or refute the water quality event.

13. The method of claim 1 further comprising formatting the received meter data for further analysis.

14. The method of claim 13 wherein formatting the received meter data comprises removing data not reflecting the actual performance of the resource distribution network.

15. The method of claim 13 wherein formatting the received meter data comprises removing selected resource distribution network phenomena or phenomena related to intentional operation of the network.

16. The method of claim 13 wherein formatting the received meter data comprises smoothing data collected from the resource distribution network.

17. The method of claim 16 wherein smoothing data collected from the resource distribution network comprises at least one of: Locally Weighted Scatterplot Smoothing and heuristic cleaning.

18. The method of claim 1 further comprising filtering the received meter data to remove meter transmission noise.

19. A non-transitory computer-readable medium comprising machine-readable instructions that when executed by a computer causes the computer to perform a method for analyzing resource distribution throughout a network, the computer-readable medium comprising:

computer program code for receiving meter data, the meter data representing a plurality of parameters measured by a plurality of meters positioned within a resource distribution network;

computer program code for receiving secondary data from one or more sources external to the meters, the secondary data representing one or more conditions affecting a condition of network assets in a region serviced by the resource distribution network;

computer program code for statistically predicting meter data for at least one meter based on secondary data;

computer program code for comparing the received meter data with the predicted meter data to detect one or more anomalies if the received meter data deviates from the predicted meter data;

computer program code for identifying a resource distribution network event on the basis of the detected anomalies wherein the computer program code for identifying the resource distribution network event comprises computer program code for identifying a faulty meter event by:

receiving a first data set representative of a first meter to be analyzed, receiving a reference data set representative of a physically separate second meter, correlating the first data set with the reference data set, determining a time shift based on the correlation of the first data set with the reference data set, and issuing a faulty meter event based on a statistical significance of the time shift; and computer program code for reporting the resource distribution network event.

20. The computer-readable medium of claim 19, further comprising: computer program code for selecting at least one parameter from the plurality of parameters; and predicting, based on linear regression and a root mean square error metric, the likely distribution of predicted values using a function of the selected at least one parameter that approximates the predicted values.

21. The computer-readable medium of claim 19, wherein statistically predicting meter data comprises:

computer program code for selecting a data set generated from the second meter among available data sets generated from other meters; and computer program code for minimizing a prediction error by analyzing all possible combinations of available data sets.

22. The computer-readable medium of claim 19, wherein selecting the data set comprises:

computer program code for finding a best fit parameter of the selected data set;

computer program code for finding an approximation error achieved of the selected data set; and computer program code for selecting at least one data set among the available data sets with the lowest approximation error.

23. The computer-readable medium of claim 19, wherein the computer program code for identifying a faulty meter event further comprises computer program code for detecting a fixed value transmission over time.

24. The computer-readable medium of claim 19, wherein the computer program code for identifying a faulty meter event further comprises computer program code for detecting a statistically unlikely magnitude of time-dependent variability.

25. The computer-readable medium of claim 19, wherein the computer program code for identifying a faulty meter event further comprises:

computer program code for calculating a frequency of data currently transmitted by a first meter;

computer program code for calculating an amount of data historically transmitted by the first meter or a second meter; and computer program code for determining a statistically significant deviation of the amount of data currently transmitted and the amount of data historically transmitted.

26. The computer-readable medium of claim 19, wherein the computer program code for identifying a faulty meter event further comprises:

computer program code for determining a supported value for a meter under analysis, the supported value based on a second meter in the network; and computer program code for comparing the supported value to an actual value produced by the meter under analysis.

27. A computerized system for analyzing resource distribution throughout a network the system comprising:

a database for storing meter data, the meter data representing a plurality of parameters measured by a plurality of meters positioned within a resource distribution network and secondary data from one or more sources external to the meters, the secondary data representing one or more conditions affecting a condition of network assets in a region serviced by the resource distribution network;

an analysis engine configured to analyze the meter data by statistically predicting meter data for at least one meter based on secondary data and comparing the stored meter data with the predicted meter data to detect one or more anomalies if the stored meter data deviates from the predicted meter data;

an event classification engine configured to identify a resource distribution network event based on the one or more anomalies by:
 receiving a first data set representative of a first meter to be analyzed,
 receiving a reference data set representative of a physically separate second meter,
 correlating the first data set with the reference data set,
 determining a time shift based on the correlation of the first data set with the reference data set, and
 issuing a faulty meter event based on a statistical significance of the time shift; and an event database for storing resource distribution network event data representing the resource distribution network event identified by the classification engine.

28. The system of claim 27, wherein the analysis engine selects at least one parameter from the plurality of parameters; and
 predicts, based on linear regression and a root mean square error metric, the likely distribution of predicted values using a function of the selected at least one parameter that approximates the predicted values.

29. The system of claim 27, wherein, in order to predict meter data, the analysis engine:
 selects a data set generated from the second meter among available data sets generated from other meters; and
 minimizes a prediction error by analyzing all possible combinations of available data sets.

30. The method of claim 1, wherein identifying a faulty meter event further comprises detecting a fixed value transmission over time.

31. The method of claim 1, wherein identifying a faulty meter event further comprises detecting a statistically unlikely magnitude of time-dependent variability.

32. The method of claim 1, wherein identifying a faulty meter event further comprises:
 calculating a frequency of data currently transmitted by a first meter;
 calculating an amount of data historically transmitted by the first meter or a second meter; and
 determining a statistically significant deviation of the amount of data currently transmitted and the amount of data historically transmitted.

33. The method of claim 1, wherein identifying a faulty meter event further comprises:
 determining a supported value for a meter under analysis, the supported value based on a second meter in the network; and
 comparing the supported value to an actual value produced by the meter under analysis.

34. A computerized method for analyzing resource distribution throughout a network, the method comprising:
 receiving meter data, the meter data representing a plurality of parameters measured by a plurality of meters positioned within a resource distribution network;
 statistically predicting meter data for at least one meter;
 comparing the received meter data with the predicted meter data to detect one or more anomalies if the received meter data deviates from the predicted meter data;
 identifying a resource distribution network event on the basis of the detected anomalies wherein identifying the resource distribution network event comprises identifying a faulty meter event by:
  receiving a first data set representative of a first meter to be analyzed,
  receiving a reference data set representative of a physically separate second meter,
  correlating the first data set with the reference data set,
  determining a time shift based on the correlation of the first data set with the reference data set, and
  issuing a faulty meter event based on a statistical significance of the time shift; and
 reporting the resource distribution network event.

* * * * *